US011831799B2

(12) United States Patent
Abdollahian et al.

(10) Patent No.: US 11,831,799 B2
(45) Date of Patent: Nov. 28, 2023

(54) PROPAGATING CONTEXT INFORMATION IN A PRIVACY PRESERVING MANNER

(71) Applicant: Apple Inc., Cupertino, CA (US)

(72) Inventors: Golnaz Abdollahian, San Francisco, CA (US); Nathaniel B. Chapman, Mahomet, IL (US); Aaron R. Zinman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/847,009

(22) Filed: Jun. 22, 2022

(65) Prior Publication Data

US 2022/0329685 A1  Oct. 13, 2022

Related U.S. Application Data

(63) Continuation of application No. 16/937,408, filed on Jul. 23, 2020, now Pat. No. 11,438,452.
(Continued)

(51) Int. Cl.
*H04M 1/72457* (2021.01)
*H04W 4/38* (2018.01)
(Continued)

(52) U.S. Cl.
CPC ... *H04M 1/72457* (2021.01); *H04M 1/72454* (2021.01); *H04W 4/029* (2018.02); *H04W 4/21* (2018.02); *H04W 4/38* (2018.02)

(58) Field of Classification Search
CPC ........ G06Q 50/01; H04W 4/029; H04W 4/02; H04W 4/21; H04W 4/38;
(Continued)

(56) References Cited

U.S. PATENT DOCUMENTS 2,495,222 A   1/1950  Bierig
5,874,958 A   2/1999  Ludolph
(Continued)

FOREIGN PATENT DOCUMENTS

CN   101404665 A   4/2009
CN   101535983 A   9/2009
(Continued)

OTHER PUBLICATIONS

Notice of Allowance received for Korean Patent Application No. 10-2021-7029647, dated Sep. 26, 2022, 3 pages (2 pages of English Translation and 1 page of Official Copy).
(Continued)

*Primary Examiner* — Dung Hong
(74) *Attorney, Agent, or Firm* — DLA Piper LLP (US)

(57) ABSTRACT

The present disclosure generally relates to propagating context information from a first electronic device to a second electronic device. In one example, in response to detecting the second electronic device satisfies a distance criterion with respect to the first electronic device, the first electronic device determines whether propagation of the context to the second electronic device is permitted. If propagation of the context to the second electronic device is permitted and while the second electronic device satisfies the distance criterion with respect to the first electronic device, the context is transmitted to the second electronic device.

33 Claims, 16 Drawing Sheets

Related U.S. Application Data

(60) Provisional application No. 62/971,643, filed on Feb. 7, 2020, provisional application No. 62/885,082, filed on Aug. 9, 2019.

(51) Int. Cl.
  *H04W 4/21* (2018.01)
  *H04W 4/029* (2018.01)
  *H04M 1/72454* (2021.01)

(58) Field of Classification Search
  CPC ..... H04M 2203/2094; H04M 1/72457; H04M 1/72454
  See application file for complete search history.

(56) References Cited

U.S. PATENT DOCUMENTS

| | | | |
|---|---|---|---|
| 5,893,063 | A | 4/1999 | Loats et al. |
| 6,125,342 | A | 9/2000 | Selesky |
| 6,163,768 | A | 12/2000 | Sherwood et al. |
| 6,311,157 | B1 | 10/2001 | Strong |
| 6,324,512 | B1 | 11/2001 | Junqua et al. |
| 6,353,794 | B1 | 3/2002 | Davis et al. |
| 6,584,439 | B1 | 6/2003 | Geilhufe et al. |
| 7,006,973 | B1 | 2/2006 | Genly |
| 7,251,696 | B1 | 7/2007 | Horvitz |
| 7,302,392 | B1 | 11/2007 | Thenthiruperai et al. |
| 8,010,131 | B2 * | 8/2011 | Rothschild ............ H04W 76/10 455/457 |
| 8,131,556 | B2 | 3/2012 | Barton et al. |
| 8,180,583 | B1 | 5/2012 | Gossweiler et al. |
| 8,260,619 | B1 | 9/2012 | Bansal et al. |
| 8,386,620 | B2 * | 2/2013 | Chatterjee ............ H04L 51/04 709/224 |
| 8,498,670 | B2 | 7/2013 | Cha et al. |
| 8,600,743 | B2 | 12/2013 | Lindahl et al. |
| 8,660,970 | B1 | 2/2014 | Fiedorowicz |
| 9,172,747 | B2 | 10/2015 | Walters et al. |
| 9,218,122 | B2 | 12/2015 | Thomas et al. |
| 9,424,840 | B1 | 8/2016 | Hart et al. |
| 9,485,286 | B1 | 11/2016 | Sellier et al. |
| 9,692,611 | B1 | 6/2017 | Tom et al. |
| 9,734,839 | B1 | 8/2017 | Adams |
| 9,826,375 | B2 * | 11/2017 | Grifoni .................... H04L 67/52 |
| 9,832,625 | B2 * | 11/2017 | Nebel .................... H04W 76/14 |
| 10,582,355 | B1 | 3/2020 | Lebeau et al. |
| 10,671,428 | B2 | 6/2020 | Zeitlin |
| 10,754,658 | B2 | 8/2020 | Tamiya |
| 10,783,883 | B2 | 9/2020 | Mixter et al. |
| 10,791,176 | B2 | 9/2020 | Phipps et al. |
| 11,438,452 | B1 | 9/2022 | Abdollahian et al. |
| 2001/0042094 | A1 | 11/2001 | Mitchell et al. |
| 2002/0087306 | A1 | 7/2002 | Lee et al. |
| 2002/0184015 | A1 | 12/2002 | Li et al. |
| 2003/0023435 | A1 | 1/2003 | Josephson |
| 2003/0093281 | A1 | 5/2003 | Geilhufe et al. |
| 2003/0151982 | A1 | 8/2003 | Brewer et al. |
| 2003/0167167 | A1 | 9/2003 | Gong |
| 2003/0233230 | A1 | 12/2003 | Ammicht et al. |
| 2004/0176958 | A1 | 9/2004 | Salmenkaita et al. |
| 2004/0225650 | A1 | 11/2004 | Cooper et al. |
| 2004/0254998 | A1 | 12/2004 | Horvitz |
| 2005/0114791 | A1 | 5/2005 | Bollenbacher et al. |
| 2005/0131690 | A1 | 6/2005 | Creamer et al. |
| 2005/0132301 | A1 | 6/2005 | Ikeda |
| 2005/0187767 | A1 | 8/2005 | Godden |
| 2006/0015340 | A1 | 1/2006 | Feng |
| 2006/0036430 | A1 | 2/2006 | Hu |
| 2006/0133339 | A1 | 6/2006 | Rosella |
| 2006/0173684 | A1 | 8/2006 | Fischer et al. |
| 2006/0195521 | A1 | 8/2006 | New et al. |
| 2006/0217231 | A1 | 9/2006 | Parks et al. |
| 2006/0271364 | A1 | 11/2006 | Mirkovic et al. |
| 2006/0291580 | A1 | 12/2006 | Horvitz |
| 2007/0033005 | A1 | 2/2007 | Cristo et al. |
| 2007/0050191 | A1 | 3/2007 | Weider et al. |
| 2007/0073874 | A1 | 3/2007 | Moghaddam et al. |
| 2007/0083660 | A1 | 4/2007 | Thornton |
| 2007/0088852 | A1 | 4/2007 | Levkovitz |
| 2007/0133771 | A1 | 6/2007 | Stifelman et al. |
| 2007/0146336 | A1 | 6/2007 | Ording et al. |
| 2007/0179776 | A1 | 8/2007 | Segond et al. |
| 2007/0208579 | A1 | 9/2007 | Peterson |
| 2007/0282595 | A1 | 12/2007 | Tunning et al. |
| 2008/0015864 | A1 | 1/2008 | Ross et al. |
| 2008/0046515 | A1 | 2/2008 | Lingafelt et al. |
| 2008/0091406 | A1 | 4/2008 | Baldwin et al. |
| 2008/0134069 | A1 | 6/2008 | Horvitz |
| 2008/0147411 | A1 | 6/2008 | Dames et al. |
| 2008/0162137 | A1 | 7/2008 | Saitoh et al. |
| 2008/0201306 | A1 | 8/2008 | Cooper et al. |
| 2008/0300871 | A1 | 12/2008 | Gilbert |
| 2009/0018839 | A1 | 1/2009 | Cooper et al. |
| 2009/0030800 | A1 | 1/2009 | Grois |
| 2009/0051649 | A1 | 2/2009 | Rondel |
| 2009/0055187 | A1 | 2/2009 | Leventhal et al. |
| 2009/0076798 | A1 | 3/2009 | Oh et al. |
| 2009/0109019 | A1 | 4/2009 | Peterson et al. |
| 2009/0112600 | A1 | 4/2009 | Gilbert et al. |
| 2009/0150156 | A1 | 6/2009 | Kennewick et al. |
| 2009/0150820 | A1 | 6/2009 | Hayman |
| 2009/0157513 | A1 | 6/2009 | Bonev et al. |
| 2009/0164450 | A1 | 6/2009 | Martinez et al. |
| 2009/0177966 | A1 | 7/2009 | Chaudhri |
| 2009/0182562 | A1 | 7/2009 | Caire et al. |
| 2009/0204409 | A1 | 8/2009 | Mozer et al. |
| 2009/0224867 | A1 * | 9/2009 | O'Shaughnessy .......................... H04M 1/72457 340/5.1 |
| 2009/0271188 | A1 | 10/2009 | Agapi et al. |
| 2009/0271189 | A1 | 10/2009 | Agapi et al. |
| 2009/0276215 | A1 | 11/2009 | Hager |
| 2009/0299730 | A1 | 12/2009 | Joh et al. |
| 2010/0054601 | A1 | 3/2010 | Anbalagan et al. |
| 2010/0057643 | A1 | 3/2010 | Yang |
| 2010/0076968 | A1 | 3/2010 | Boyns et al. |
| 2010/0076993 | A1 | 3/2010 | Klawitter et al. |
| 2010/0077350 | A1 | 3/2010 | Lim et al. |
| 2010/0088093 | A1 | 4/2010 | Lee et al. |
| 2010/0150321 | A1 | 6/2010 | Harris et al. |
| 2010/0185448 | A1 | 7/2010 | Meisel |
| 2010/0199180 | A1 | 8/2010 | Brichter |
| 2010/0199340 | A1 | 8/2010 | Jonas et al. |
| 2010/0223056 | A1 | 9/2010 | Kadirkamanathan |
| 2010/0229082 | A1 | 9/2010 | Karmarkar et al. |
| 2010/0250727 | A1 | 9/2010 | King et al. |
| 2010/0257490 | A1 | 10/2010 | Lyon et al. |
| 2010/0312547 | A1 | 12/2010 | Van Os et al. |
| 2010/0333163 | A1 | 12/2010 | Daly |
| 2011/0022388 | A1 | 1/2011 | Wu et al. |
| 2011/0039584 | A1 | 2/2011 | Merrett |
| 2011/0131045 | A1 | 6/2011 | Cristo et al. |
| 2011/0143718 | A1 | 6/2011 | Engelhart, Sr. |
| 2011/0161076 | A1 | 6/2011 | Davis et al. |
| 2011/0183627 | A1 | 7/2011 | Ueda et al. |
| 2011/0183650 | A1 | 7/2011 | Mckee |
| 2011/0184730 | A1 | 7/2011 | LeBeau et al. |
| 2012/0016678 | A1 | 1/2012 | Gruber et al. |
| 2012/0035932 | A1 | 2/2012 | Jitkoff et al. |
| 2012/0089659 | A1 | 4/2012 | Halevi et al. |
| 2012/0105257 | A1 | 5/2012 | Murillo et al. |
| 2012/0197967 | A1 | 8/2012 | Sivavakeesar |
| 2012/0233280 | A1 | 9/2012 | Ebara |
| 2012/0265528 | A1 | 10/2012 | Gruber et al. |
| 2013/0030904 | A1 | 1/2013 | Aidasani et al. |
| 2013/0035994 | A1 | 2/2013 | Pattan et al. |
| 2013/0086609 | A1 | 4/2013 | Levy et al. |
| 2013/0111330 | A1 | 5/2013 | Staikos et al. |
| 2013/0184007 | A1 * | 7/2013 | Hategan ............ G06Q 30/0259 455/456.1 |
| 2013/0197914 | A1 | 8/2013 | Yelvington et al. |
| 2013/0260739 | A1 | 10/2013 | Saino |
| 2013/0297319 | A1 | 11/2013 | Kim |

(56) References Cited

U.S. PATENT DOCUMENTS

| | | |
|---|---|---|
| 2013/0311997 A1 | 11/2013 | Gruber et al. |
| 2013/0315038 A1 | 11/2013 | Ferren et al. |
| 2013/0325460 A1 | 12/2013 | Kim et al. |
| 2013/0332538 A1 | 12/2013 | Clark et al. |
| 2014/0024956 A1 | 1/2014 | Purdy et al. |
| 2014/0040748 A1 | 2/2014 | Lemay et al. |
| 2014/0120954 A1 | 5/2014 | Horvitz et al. |
| 2014/0149060 A1 | 5/2014 | Meduna et al. |
| 2014/0244712 A1 | 8/2014 | Walters et al. |
| 2014/0269658 A1 | 9/2014 | Sadasivam et al. |
| 2014/0278413 A1 | 9/2014 | Pitschel et al. |
| 2014/0297284 A1 | 10/2014 | Gruber et al. |
| 2014/0365885 A1 | 12/2014 | Carson et al. |
| 2015/0067819 A1 | 3/2015 | Shribman et al. |
| 2015/0127348 A1 | 5/2015 | Follis |
| 2015/0169284 A1 | 6/2015 | Quast et al. |
| 2015/0178362 A1 | 6/2015 | Wheeler |
| 2015/0186892 A1 | 7/2015 | Zhang et al. |
| 2015/0205632 A1 | 7/2015 | Gaster |
| 2015/0242091 A1 | 8/2015 | Lu et al. |
| 2015/0347552 A1 | 12/2015 | Habouzit et al. |
| 2015/0348554 A1 | 12/2015 | Orr et al. |
| 2015/0349934 A1 | 12/2015 | Pollack et al. |
| 2015/0371664 A1 | 12/2015 | Bar-or et al. |
| 2016/0021153 A1* | 1/2016 | Hull ................. G06F 16/337 715/753 |
| 2016/0036953 A1 | 2/2016 | Lee et al. |
| 2016/0080475 A1 | 3/2016 | Singh et al. |
| 2016/0094936 A1* | 3/2016 | Yang ................. H04Q 9/00 455/456.1 |
| 2016/0149966 A1 | 5/2016 | Remash et al. |
| 2016/0170710 A1 | 6/2016 | Kim et al. |
| 2016/0171980 A1 | 6/2016 | Liddell et al. |
| 2016/0179075 A1* | 6/2016 | Shin ................. G06F 3/016 700/275 |
| 2016/0198322 A1* | 7/2016 | Pitis ................. H04W 4/18 455/420 |
| 2016/0260433 A1 | 9/2016 | Sumner et al. |
| 2016/0284172 A1 | 9/2016 | Weast et al. |
| 2016/0309035 A1 | 10/2016 | Li |
| 2016/0337453 A1* | 11/2016 | Lee ................. G06F 3/04817 |
| 2016/0353245 A1* | 12/2016 | Kulikov ................. H04W 4/025 |
| 2017/0006329 A1 | 1/2017 | Jang et al. |
| 2017/0032791 A1 | 2/2017 | Elson et al. |
| 2017/0038847 A1* | 2/2017 | Schorsch ................. G06F 1/163 |
| 2017/0041388 A1 | 2/2017 | Tal et al. |
| 2017/0068423 A1 | 3/2017 | Napolitano et al. |
| 2017/0068550 A1 | 3/2017 | Zeitlin |
| 2017/0116987 A1 | 4/2017 | Kang et al. |
| 2017/0161018 A1 | 6/2017 | Lemay et al. |
| 2017/0289738 A1 | 10/2017 | Jepson et al. |
| 2017/0301348 A1 | 10/2017 | Chen et al. |
| 2017/0371885 A1 | 12/2017 | Aggarwal et al. |
| 2018/0005442 A1 | 1/2018 | Mullins |
| 2018/0007099 A1* | 1/2018 | Ein-Gil ................. H04L 65/403 |
| 2018/0033435 A1 | 2/2018 | Jacobs, II |
| 2018/0190273 A1 | 7/2018 | Karimli et al. |
| 2018/0205983 A1 | 7/2018 | Lee et al. |
| 2018/0221783 A1 | 8/2018 | Gamero |
| 2018/0332118 A1 | 11/2018 | Phipps et al. |
| 2018/0336049 A1 | 11/2018 | Mukherjee et al. |
| 2019/0049250 A1 | 2/2019 | Takaoka et al. |
| 2019/0220247 A1 | 7/2019 | Lemay et al. |
| 2019/0278354 A1* | 9/2019 | Alameh ................. G06F 3/013 |
| 2019/0385418 A1 | 12/2019 | Mixter et al. |
| 2020/0187869 A1 | 6/2020 | Thiemjarus et al. |
| 2020/0267222 A1 | 8/2020 | Phipps et al. |
| 2020/0298394 A1 | 9/2020 | Han et al. |
| 2020/0302930 A1 | 9/2020 | Chen et al. |
| 2021/0329073 A1 | 10/2021 | Sharma et al. |
| 2022/0021762 A1 | 1/2022 | Joshi et al. |
| 2022/0224789 A1 | 7/2022 | Abdollahian et al. |

FOREIGN PATENT DOCUMENTS

| | | |
|---|---|---|
| CN | 101939740 A | 1/2011 |
| CN | 102792320 A | 11/2012 |
| CN | 104335234 A | 2/2015 |
| CN | 105264524 A | 1/2016 |
| CN | 105830048 A | 8/2016 |
| CN | 105917311 A | 8/2016 |
| CN | 106415412 A | 2/2017 |
| EP | 0852052 A1 | 7/1998 |
| EP | 1739546 A2 | 1/2007 |
| EP | 2575128 A2 | 4/2013 |
| EP | 3392876 A1 | 10/2018 |
| JP | 8-339288 A | 12/1996 |
| JP | 2001-22372 A | 1/2001 |
| JP | 2001-27897 A | 1/2001 |
| JP | 2001-75777 A | 3/2001 |
| JP | 2001-109493 A | 4/2001 |
| JP | 2001-216131 A | 8/2001 |
| JP | 2004-239963 A | 8/2004 |
| JP | 2006-146182 A | 6/2006 |
| JP | 2009-521753 A | 6/2009 |
| JP | 2010-66519 A | 3/2010 |
| JP | 2010-79103 A | 4/2010 |
| JP | 2013-527947 A | 7/2013 |
| KR | 10-2002-0020585 A | 3/2002 |
| KR | 10-2004-0088975 A | 10/2004 |
| KR | 10-2006-0055313 A | 5/2006 |
| KR | 10-2011-0086492 A | 7/2011 |
| KR | 10-2016-0004351 A | 1/2016 |
| KR | 10-2016-0101079 A | 8/2016 |
| KR | 10-2016-0147854 A | 12/2016 |
| KR | 10-2017-0004482 A | 1/2017 |
| WO | 2001/18691 A2 | 3/2001 |
| WO | 2001/30026 A2 | 4/2001 |
| WO | 2003/107179 A1 | 12/2003 |
| WO | 2007/076210 A1 | 7/2007 |
| WO | 2011/088053 A2 | 7/2011 |
| WO | 2011/116309 A1 | 9/2011 |
| WO | 2011/088053 A3 | 1/2012 |
| WO | 2012/084965 A1 | 6/2012 |
| WO | 2012/167168 A2 | 12/2012 |
| WO | 2013/137660 A1 | 9/2013 |
| WO | 2015/094169 A1 | 6/2015 |
| WO | 2015/112625 A1 | 7/2015 |
| WO | 2015/183401 A1 | 12/2015 |
| WO | 2016/040721 A1 | 3/2016 |

OTHER PUBLICATIONS

Advisory Action received for U.S. Appl. No. 15/417,069, dated Dec. 16, 2019, 7 pages.

Advisory Action received for U.S. Appl. No. 15/417,069, dated Mar. 9, 2021, 4 pages.

Advisory Action received for U.S. Appl. No. 16/362,441, dated Nov. 23, 2021, 5 pages.

Advisory Action received for U.S. Appl. No. 16/867,510, dated Sep. 24, 2021, 5 pages.

Advisory Action received for U.S. Appl. No. 15/675,649, dated Jul. 8, 2018, 4 Pages.

Applicant Initiated Interview Summary received for U.S. Appl. No. 15/417,069, dated Dec. 2, 2019, 4 pages.

Applicant Initiated Interview Summary received for U.S. Appl. No. 15/675,649, dated Dec. 16, 2019, 4 pages.

Applicant Initiated Interview Summary received for U.S. Appl. No. 16/362,441, dated Jun. 18, 2020, 4 pages.

Applicant Initiated Interview Summary received for U.S. Appl. No. 16/362,441, dated Oct. 26, 2021, 5 pages.

Applicant-Initiated Interview Summary received for U.S. Appl. No. 15/417,069, dated Aug. 11, 2020, 4 pages.

Applicant-Initiated Interview Summary received for U.S. Appl. No. 16/362,441, dated Dec. 21, 2020, 5 pages.

Applicant-Initiated Interview Summary received for U.S. Appl. No. 16/362,441, dated Jun. 28, 2021, 5 pages.

Applicant-Initiated Interview Summary received for U.S. Appl. No. 16/362,441, dated Sep. 28, 2022, 4 pages.

(56) References Cited

OTHER PUBLICATIONS

Applicant-Initiated Interview Summary received for U.S. Appl. No. 16/867,510, dated Aug. 31, 2021, 4 Pages.
Applicant-Initiated Interview Summary received for U.S. Appl. No. 16/867,510, dated Jan. 10, 2022, 5 pages.
Brief Communication regarding Oral Proceedings received for European Patent Application No. 18154657.3, dated Jan. 28, 2020, 3 pages.
Brief Communication Regarding Oral Proceedings received for European Patent Application No. 18724081.7, dated Oct. 5, 2020, 2 pages.
Corrected Notice of Allowance received for U.S. Appl. No. 16/867,510, dated Apr. 21, 2022, 2 pages.
Corrected Notice of Allowance received for U.S. Appl. No. 14/046,871, dated Dec. 20, 2018, 2 pages.
Corrected Notice of Allowance received for U.S. Appl. No. 14/046,871, dated Jul. 5, 2018, 2 pages.
Corrected Notice of Allowance received for U.S. Appl. No. 15/417,069, dated Jun. 4, 2021, 2 pages.
Corrected Notice of Allowance received for U.S. Appl. No. 15/417,069, dated Jun. 14, 2021, 4 pages.
Corrected Notice of Allowance received for U.S. Appl. No. 15/675,649, dated Apr. 10, 2020, 2 pages.
Corrected Notice of Allowance received for U.S. Appl. No. 15/675,649, dated Mar. 6, 2020, 2 pages.
Corrected Notice of Allowance received for U.S. Appl. No. 16/867,510, dated May 25, 2022, 2 pages.
Decision to Grant received for European Patent Application No. 18724081.7, dated Feb. 25, 2021, 2 pages.
Decision to Grant received for European Patent Application No. 20211162.1, dated Jun. 23, 2022, 2 pages.
Decision to Grant received for Japanese Patent Application No. 2020-125245, dated Apr. 27, 2022, 3 pages (1 page of English Translation and 2 pages of Official Copy).
European Search Report received for European Patent Application No. 20211162.1, dated Mar. 15, 2021, 6 pages.
Examiner Initiated Interview Summary received for U.S. Appl. No. 16/867,510, dated Jun. 1, 2021, 5 pages.
Extended European Search Report received for European Patent Application No. 16195814.5, dated Jul. 5, 2017, 13 pages.
Extended European Search Report received for European Patent Application No. 18154657.3, dated Sep. 20, 2018, 12 pages.
Final Office Action received for U.S. Appl. No. 13/250,854, dated May 26, 2016, 42 pages.
Final Office Action received for U.S. Appl. No. 13/250,854, dated Oct. 20, 2014, 51 pages.
Final Office Action received for U.S. Appl. No. 14/303,413, dated Nov. 20, 2014, 18 pages.
Final Office Action received for U.S. Appl. No. 14/303,413, dated Oct. 5, 2015, 21 pages.
Final Office Action received for U.S. Appl. No. 15/417,069, dated Dec. 24, 2020, 17 pages.
Final Office Action received for U.S. Appl. No. 15/417,069, dated Oct. 3, 2019, 17 pages.
Final Office Action received for U.S. Appl. No. 15/675,649, dated Mar. 5, 2019, 22 pages.
Final Office Action received for U.S. Appl. No. 16/362,441, dated Oct. 21, 2020, 14 pages.
Final Office Action received for U.S. Appl. No. 16/362,441, dated Oct. 4, 2021, 18 pages.
Final Office Action received for U.S. Appl. No. 16/867,510, dated Jun. 29, 2021, 76 pages.
Intention to Grant received for Danish Patent Application No. PA201770433, dated Oct. 5, 2018, 2 pages.
Intention to Grant received for Danish Patent Application No. PA201770433, dated Sep. 27, 2018, 2 pages.
Intention to Grant received for European Patent Application No. 18724081.7, dated Oct. 27, 2020, 8 pages.
Intention to Grant received for European Patent Application No. 20211162.1, dated Apr. 7, 2022, 9 pages.
International Preliminary Report on Patentability received for PCT Patent Application No. PCT/US2018/029471, dated Nov. 21, 2019, 11 pages.
International Search Report and Written Opinion received for PCT Patent Application No. PCT/US2018/029471, dated Oct. 31, 2018, 17 pages.
Invitation to Pay Additional Fees and Partial International Search Report received for PCT Patent Application No. PCT/US2018/029471, dated Jul. 12, 2018, 9 Pages.
Non-Final Office Action received for U.S. Appl. No. 15/417,069, dated Mar. 29, 2019, 15 pages.
Non-Final Office Action received for U.S. Appl. No. 13/250,854, dated Mar. 20, 2014, 61 pages.
Non-Final Office Action received for U.S. Appl. No. 13/250,854, dated Oct. 19, 2015, 47 pages.
Non-Final Office Action received for U.S. Appl. No. 13/250,854, dated Feb. 27, 2017, 50 pages.
Non-Final Office Action received for U.S. Appl. No. 14/046,871, dated Apr. 29, 2016, 18 pages.
Non-Final Office Action received for U.S. Appl. No. 14/046,871, dated Oct. 18, 2017, 20 pages.
Non-Final Office Action received for U.S. Appl. No. 14/046,871, dated Sep. 24, 2015, 18 pages.
Non-Final Office Action received for U.S. Appl. No. 14/303,413, dated Aug. 1, 2014, 18 pages.
Non-Final Office Action received for U.S. Appl. No. 14/303,413, dated May 12, 2015, 18 pages.
Non-Final Office Action received for U.S. Appl. No. 14/303,413, dated Jan. 8, 2019, 28 pages.
Non-Final Office Action received for U.S. Appl. No. 14/303,413, dated Jan. 23, 2019, 23 pages.
Non-Final Office Action received for U.S. Appl. No. 15/417,069, dated Jun. 18, 2020, 17 pages.
Non-Final Office Action received for U.S. Appl. No. 15/675,649, dated Sep. 27, 2018, 20 pages.
Non-Final Office Action received for U.S. Appl. No. 15/675,649, dated Sep. 5, 2019, 37 pages.
Non-Final Office Action received for U.S. Appl. No. 16/362,441, dated Jun. 23, 2022, 17 pages.
Non-Final Office Action received for U.S. Appl. No. 16/362,441, dated Mar. 23, 2021, 16 pages.
Non-Final Office Action received for U.S. Appl. No. 16/362,441, dated Mar. 26, 2020, 13 pages.
Non-Final Office Action received for U.S. Appl. No. 16/867,510, dated Mar. 9, 2021, 72 pages.
Non-Final Office Action received for U.S. Appl. No. 16/867,510, dated Oct. 22, 2021, 62 pages.
Notice of Acceptance received for Australian Patent Application No. 2017203847, dated Oct. 23, 2018, 3 pages.
Notice of Acceptance received for Australian Patent Application No. 2019200732, dated Feb. 25, 2021, 3 pages.
Notice of Acceptance received for Australian Patent Application No. 2019280008, dated Jan. 7, 2021, 3 pages.
Notice of Acceptance received for Australian Patent Application No. 2020281128, dated Oct. 14, 2021, 3 pages.
Notice of Acceptance received for Australian Patent Application No. 2021203908, dated Jul. 6, 2021, 3 pages.
Notice of Allowance received for Brazilian Patent Application No. BR102012024861-1, dated Nov. 24, 2020, 3 pages (1 page of English Translation and 2 pages of Official Copy).
Notice of Allowance received for Canadian Patent Application No. 2,791,277, dated May 15, 2018, 1 page.
Notice of Allowance received for Canadian Patent Application No. 3,023,918, dated Aug. 18, 2022, 1 page.
Notice of Allowance received for Chinese Patent Application No. 201210599203.8, dated Jan. 3, 2017, 2 pages (1 page of English Translation and 1 page of Official Copy).
Notice of Allowance received for Chinese Patent Application No. 201880000659.3, dated Mar. 10, 2020, 4 pages (1 page of English Translation and 3 pages of Official Copy).
Notice of Allowance received for Danish Patent Application No. PA201770433, dated Feb. 4, 2019, 2 pages.

(56) References Cited

OTHER PUBLICATIONS

Notice of Allowance received for GB Patent Application No. GB1217449.6, dated Sep. 27, 2016, 2 pages.
Notice of Allowance received for Japanese Patent Application No. 2012-230300, dated Jan. 13, 2015, 3 pages (Official Copy Only) (See Communication under 37 CFR § 1.98(a) (3)).
Notice of Allowance received for Japanese Patent Application No. 2015-025813, dated Jan. 4, 2018, 3 pages (1 pages of English Translation and 2 pages of official copy).
Notice of Allowance received for Japanese Patent Application No. 2017-062372, dated Jun. 22, 2020, 3 pages (1 page of English Translation and 2 pages of Official Copy).
Notice of Allowance received for Korean Patent Application No. 10-2012-109552, dated Aug. 29, 2016, 3 pages (1 pages of English Translation and 2 pages of official copy).
Notice of Allowance received for Korean Patent Application No. 10-2016-0161496, dated Aug. 16, 2019, 4 pages (2 pages of English Translation and 2 pages of Official Copy).
Notice of Allowance received for Korean Patent Application No. 10-2018-0050592, dated May 28, 2020, 5 pages (2 pages of English Translation and 3 pages of Official Copy).
Notice of Allowance received for Korean Patent Application No. 10-2018-7034446, dated Feb. 7, 2019, 3 pages (1 page of English Translation and 2 pages of Official Copy).
Notice of Allowance received for Korean Patent Application No. 10-2019-0148423, dated Jun. 29, 2021, 3 pages (1 page of English Translation and 2 pages of Official Copy).
Notice of Allowance received for Korean Patent Application No. 10-2019-7013058, dated Oct. 28, 2020, 7 pages (3 pages of English Translation and 4 pages of Official Copy).
Notice of Allowance received for Korean Patent Application No. 10-2021-0128938, dated Jun. 21, 2022, 5 pages.
Notice of Allowance received for Korean Patent Application No. 10-2021-7002968, dated Jun. 17, 2021, 3 pages (1 page of English Translation and 2 pages of Official Copy).
Notice of Allowance received for U.S. Appl. No. 13/250,854, dated Oct. 11, 2017, 10 pages.
Notice of Allowance received for U.S. Appl. No. 14/046,871, dated Jun. 7, 2018, 16 pages.
Notice of Allowance received for U.S. Appl. No. 14/046,871, dated Nov. 4, 2016, 8 pages.
Notice of Allowance received for U.S. Appl. No. 14/046,871, dated Oct. 26, 2018, 8 pages.
Notice of Allowance received for U.S. Appl. No. 14/303,413, dated Jul. 8, 2019, 13 pages.
Notice of Allowance received for U.S. Appl. No. 15/417,069, dated May 12, 2021, 9 pages.
Notice of Allowance received for U.S. Appl. No. 15/675,649, dated Feb. 5, 2020, 17 pages.
Notice of Allowance received for U.S. Appl. No. 16/867,510, dated Feb. 23, 2022, 23 pages.
Notice of Allowance received for U.S. Appl. No. 16/867,510, dated May 4, 2022, 22 pages.
Notice of Hearing received for Indian Patent Application No. 4079/CHE/2012, dated Jul. 3, 2020, 3 pages.
Office Action received for Australian Patent Application No. 2012232977, dated Jan. 8, 2015, 3 pages.
Office Action received for Australian Patent Application No. 2012232977, dated May 18, 2015, 4 pages.
Office Action received for Australian Patent Application No. 2012232977, dated Sep. 23, 2013, 3 pages.
Office Action received for Australian Patent Application No. 2015203483, dated Feb. 2, 2017, 3 pages.
Office Action received for Australian Patent Application No. 2015203483, dated Jun. 7, 2016, 3 pages.
Office Action received for Australian Patent Application No. 2015203483, dated May 29, 2017, 4 pages.
Office Action received for Australian Patent Application No. 2017203847, dated Apr. 26, 2018, 4 pages.
Office Action received for Australian Patent Application No. 2018256560, dated Aug. 9, 2019, 4 pages.
Office Action received for Australian Patent Application No. 2018256560, dated Dec. 10, 2019, 6 pages.
Office Action received for Australian Patent Application No. 2018256560, dated Dec. 13, 2018, 5 pages.
Office Action received for Australian Patent Application No. 2018256560, dated Sep. 16, 2019, 7 pages.
Office Action received for Australian Patent Application No. 2019200732, dated Feb. 8, 2021, 6 pages.
Office Action received for Australian Patent Application No. 2019200732, dated Feb. 21, 2020, 3 pages.
Office Action received for Australian Patent Application No. 2019200732, dated Oct. 7, 2020, 6 pages.
Office Action received for Australian Patent Application No. 2019280008, dated Nov. 25, 2020, 4 pages.
Office Action received for Australian Patent Application No. 2020281128, dated Jan. 11, 2021, 5 pages.
Office Action received for Australian Patent Application No. 2020281128, dated Jun. 29, 2021, 3 pages.
Office Action received for Australian Patent Application No. 2021203914, dated Apr. 22, 2022, 2 pages.
Office Action received for Brazilian Patent Application No. BR102012024861-1, dated Aug. 21, 2020, 4 pages (1 page of English Translation and 3 pages of Official Copy).
Office Action received for Brazilian Patent Application No. BR102012024861-1, dated Sep. 4, 2019, 4 pages (1 page of English Translation and 3 pages of Official Copy).
Office Action received for Canadian Patent Application No. 2,791,277, dated Aug. 19, 2016, 3 pages.
Office Action received for Canadian Patent Application No. 2,791,277, dated Jun. 8, 2017, 8 pages.
Office Action received for Canadian Patent Application No. 2,791,277, dated Sep. 23, 2015, 8 pages.
Office Action received for Canadian Patent Application No. 3,023,918, dated Mar. 30, 2021, 5 pages.
Office Action received for Canadian Patent Application No. 3,023,918, dated Sep. 25, 2019, 4 pages.
Office Action received for Chinese Patent Application No. 201210599203.8, dated Dec. 3, 2014, 13 pages (4 pages of English Translation and 9 pages of Official Copy).
Office Action received for Chinese Patent Application No. 201210599203.8, dated Jul. 30, 2015, 12 pages (4 pages of English Translation and 8 pages of Official Copy).
Office Action received for Chinese Patent Application No. 201210599203.8, dated Mar. 28, 2016, 4 pages (1 page of English Translation and 3 pages of Official copy).
Office Action received for Chinese Patent Application No. 201880000659.3, dated Aug. 9, 2019, 10 pages (5 pages of English Translation and 5 pages of Official Copy).
Office Action received for Chinese Patent Application No. 202010449267.4, dated Aug. 25, 2021, 35 pages (22 pages of English Translation and 13 pages of Official Copy).
Office Action received for Chinese Patent Application No. 202010449267.4, dated Jun. 16, 2021, 12 pages (6 pages of English Translation and 6 pages of Official Copy).
Office Action received for Chinese Patent Application No. 202010449267.4, dated Mar. 8, 2022, 28 pages (18 pages of English Translation and 10 pages of Official Copy).
Office Action received for Chinese Patent Application No. 202010449267.4, dated Nov. 3, 2021, 32 pages (21 pages of English Translation and 11 pages of Official Copy).
Office Action received for Danish Patent Application No. PA201770433, dated Mar. 6, 2018, 4 pages.
Office Action received for Danish Patent Application No. PA201870768, dated May 25, 2020, 5 pages.
Office Action received for European Patent Application No. 12186663.6, dated Apr. 22, 2014, 5 pages.
Office Action received for European Patent Application No. 12186663.6, dated May 27, 2015, 10 pages.
Office Action received for European Patent Application No. 18154657.3, dated May 27, 2019, 7 pages.

(56) References Cited

OTHER PUBLICATIONS

Office Action received for European Patent Application No. 18724081.7, dated Mar. 26, 2019, 4 pages.
Office Action received for European Patent Application No. 20211162.1, dated Mar. 26, 2021, 7 pages.
Office Action received for European Patent Application No. 20211162.1, dated Oct. 1, 2021, 4 pages.
Office Action received for GB Patent Application No. GB1217449.6, dated Aug. 10, 2016, 5 pages.
Office Action received for GB Patent Application No. GB1217449.6, dated Feb. 15, 2016, 4 pages.
Office Action received for GB Patent Application No. GB1217449.6, dated Jun. 6, 2016, 4 pages.
Office Action received for GB Patent Application No. GB1217449.6, dated Mar. 8, 2016, 5 pages.
Office Action received for GB Patent Application No. GB1217449.6, dated May 27, 2016, 6 pages.
Office Action received for GB Patent Application No. GB1217449.6, dated Nov. 20, 2013, 5 pages.
Office Action received for GB Patent Application No. GB1217449.6, dated Oct. 13, 2015, 4 pages.
Office Action received for GB Patent Application No. GB1217449.6, dated Sep. 8, 2016, 5 pages.
Office Action received for German Patent Application No. 102012019178.2, dated Dec. 16, 2013, 10 pages (4 pages of English Translation and 6 pages of Official Copy).
Office Action received for Indian Patent Application No. 4079CHE2012, dated Aug. 29, 2018, 6 pages.
Office Action received for Japanese Patent Application No. 2012-230300, dated Sep. 22, 2014, 5 pages (3 pages of English Translation and 2 pages of Official Copy).
Office Action received for Japanese Patent Application No. 2015-025813, dated Jan. 25, 2016, 4 pages (2 pages of English Translation and 2 pages of official copy).
Office Action received for Japanese Patent Application No. 2015-025813, dated Jun. 15, 2016, 5 pages (2 pages of English Translation and 3 pages of Official Copy).
Office Action received for Japanese Patent Application No. 2015-025813, dated Nov. 28, 2016, 6 pages (3 pages of English translation and 3 pages of official copy).
Office Action received for Japanese Patent Application No. 2017-062372, dated Dec. 2, 2019, 6 pages (3 pages of English Translation and 3 pages of Official Copy).
Office Action received for Japanese Patent Application No. 2017-062372, dated Jun. 4, 2018, 4 pages (1 page of English Translation and 3 pages of Official copy).
Office Action received for Japanese Patent Application No. 2017-062372, dated May 13, 2019, 3 pages (1 page of English Translation and 2 pages of Official Copy).
Office Action received for Japanese Patent Application No. 2020-125245, dated Sep. 1, 2021, 5 pages (3 pages of English Translation and 2 pages of Official Copy).
Office Action received for Korean Patent Application No. 10-2012-109552, dated Feb. 27, 2015, 7 pages (3 pages of English Translation and 4 pages of Official Copy).
Office Action received for Korean Patent Application No. 10-2012-109552, dated Jan. 29, 2014, 9 pages (4 pages of English Translation and 5 pages of Official Copy).
Office Action received for Korean Patent Application No. 10-2012-109552, dated Mar. 31, 2016, 10 pages (5 pages of English Translation and 5 pages of Official Copy).
Office Action received for Korean Patent Application No. 10-2016-0161496, dated Jan. 30, 2018, 7 pages (3 pages of English Translation and 4 pages of Official Copy).
Office Action received for Korean Patent Application No. 10-2016-0161496, dated Jul. 19, 2019, 27 pages (11 pages of English Translation and 16 pages of Official Copy).
Office Action received for Korean Patent Application No. 10-2016-0161496, dated Mar. 6, 2017, 10 pages (5 pages of English Translation and 5 pages of Official Copy).
Office Action received for Korean Patent Application No. 10-2018-0050592, dated Aug. 22, 2018, 9 pages (4 pages of English Translation and 5 pages of Official Copy).
Office Action received for Korean Patent Application No. 10-2019-0148423, dated Feb. 10, 2020, 9 pages (4 pages of English Translation and 5 pages of Official Copy).
Office Action received for Korean Patent Application No. 10-2019-0148423, dated Feb. 26, 2021, 7 pages (3 pages of English Translation and 4 pages of Official Copy).
Office Action received for Korean Patent Application No. 10-2019-7013058, dated Feb. 7, 2020, 5 pages (2 pages of English Translation and 3 pages of Official Copy).
Office Action received for Korean Patent Application No. 10-2021-0128938, dated Dec. 31, 2021, 5 pages (2 pages of English Translation and 3 pages of Official Copy).
Office Action received for Korean Patent Application No. 10-2021-7002968, dated Apr. 13, 2021, 5 pages (2 pages of English Translation and 3 pages of Official Copy).
Office Action received for Korean Patent Application No. 10-2021-7029647, dated Mar. 21, 2022, 14 pages (7 pages of English Translation and 7 pages of Official Copy).
Office Action received for Korean Patent Application No. 10-2021-7029647, dated Sep. 28, 2021, 18 pages (9 pages of English Translation and 9 pages of Official Copy).
Office Action received for Korean Patent Application No. 10-2018-0050592, dated Jun. 29, 2019, 9 Pages (4 Pages of English Translation and 5 Pages of Official copy).
Office Action received for Mexican Patent Application No. MX/a/2012/011426, dated Nov. 21, 2013, 7 pages (4 pages of English Translation and 3 pages of Official Copy).
Office Action received for Russian Patent Application No. 2012141604, dated Jan. 23, 2014, 9 pages (4 pages of English Translation and 5 pages of Official Copy).
Search Report and Opinion received for Danish Patent Application No. PA201870768, dated Aug. 16, 2019, 9 pages.
Search Report received for Danish Patent Application No. PA201770433, dated Sep. 5, 2017, 11 pages.
Search Report received for Netherlands Patent Application No. 2009544, dated Mar. 6, 2017, 11 pages (1 page of English Translation and 10 pages of Official Copy).
Summon to Attend Oral Proceedings received for German Patent Application No. 102012019178.2, mailed on Mar. 1, 2017, 4 pages (2 pages of English Translation and 2 pages of official copy).
Summons to Attend Oral Proceedings received for European Patent Application No. 12186663.6, mailed on Apr. 27, 2016, 1 page.
Summons to Attend Oral Proceedings received for European Patent Application No. 12186663.6, mailed on Nov. 18, 2015, 9 pages.
Summons to Attend Oral Proceedings received for European Patent Application No. 18154657.3, mailed on Dec. 13, 2019, 9 pages.
Summons to Attend Oral Proceedings received for European Patent Application No. 18724081.7, mailed on Oct. 14, 2019, 3 pages.
Summons to Oral Proceedings received for German Patent Application No. 102012019178.2, mailed on Mar. 11, 2020, 3 pages (1 page of English Translation and 2 pages of Official Copy).
Combined Search Report and Examination Report received for GB Patent Application No. GB1217449.6, dated Jan. 17, 2013, 4 pages.
Extended European Search Report (includes Supplementary European Search Report and Search Opinion) received for European Patent Application No. 12186663.6, dated Jul. 16, 2013, 6 pages.
API.AI, "Android App Review—Speaktoit Assistant", Available at <https://www.youtube.com/watch?v=myE498nyfGw>, Mar. 30, 2011, 3 pages.
Ashbrook Daniell., "Enabling Mobile Microinteractions", Retrieved from the Internet: URL: http://danielashbrook.com/wp-content/uploads/2012/06/2009-Ashbrook-Thesis.pdf, May 2010, 186 pages.
Choi et al., "Acoustic and Visual Signal based Context Awareness System for Mobile Application", IEEE Transactions on Consumer Electronics, vol. 57, No. 2, May 2011, pp. 738-746.
Franza Thomas, "How to Configure Your Microphone in Windows 7", Online available at: https://www.youtube.com/watch?v=4kAVInqcQ80, Apr. 20, 2011, 2 pages.

(56) References Cited

OTHER PUBLICATIONS

Iclarified, "How to Use Voice Control on Your iPhone 3GS", Online Available at: <https://www.iclarified.com/4296/how-to-use-voice-control-on-your-iphone-3g-s>, Jun. 19, 2009, 16 pages.

Morton Philip, "Checking If an Element Is Hidden", StackOverflow, Available at <http://stackoverflow.com/questions/178325/checking-if-an-element-is-hidden>, Oct. 7, 2008, 12 pages.

Navigli Roberto, "Word Sense Disambiguation: A Survey", ACM Computing Surveys, vol. 41, No. 2, Article 10, Feb. 2009, 69 pages.

Powell Josh, "Now You See Me . . . Show/Hide Performance", available at <http://www.learningjquery.com/2010/05/now-you-see-me-showhide-performance>, May 4, 2010.

Rettinger Jon, "iPhone 3GS—Voice Controls", Online Available at: <https://www.youtube.com/watch?v=jPecb7R3oY4>, Jun. 19, 2009, 6 pages.

Samsung,"SGH-a885 Series—Portable Quad-Band Mobile Phone-User Manual", Retrieved from the Internet: URL: http://web.archive.org/web/20100106113758/http://www.comparecellular.com/images/phones/userguide1896.pdf, Jan. 1, 2009, 144 pages.

Sirivid., "Siri—The Personal Assistant on your Phone", Available on: https://www.youtube.com/watch?v=MpjpVAB06O4, Feb. 2010, 3 pages.

Applicant-Initiated Interview Summary received for U.S. Appl. No. 16/937,408, dated Apr. 7, 2022, 4 pages.

Anonymous, "Better Mood Tracker—Lucid Dreaming App", XP055707114, Online Available at: https://web.archive.org/web/20190308102914/http://luciddreamingapp.com/better-moad-tracker/, Mar. 8, 2019, 11 pages.

Baby Connect, "Demo Daily Connect", XP054980604, Online Available at: https://www.youtube.com/watch?v=iqHbq5ru28s, Mar. 6, 2014, 1 page.

Hello Daylio, "Daylio: Diary and Mood Tracker", XP054980605, Online Available at https://www.youtube.com/watch?v=5gQUG3gMWik, Aug. 23, 2015, 1 page.

International Preliminary Report on Patentability received for PCT Patent Application No. PCT/US2020/027300, dated Nov. 11, 2021, 22 pages.

International Search Report and Written Opinion received for PCT Patent Application No. PCT/US2020/027300, dated Aug. 4, 2020, 28 pages.

Invitation to Pay Additional Fees received for PCT Patent Application No. PCT/US2020/027300, dated Jun. 30, 2020, 16 pages.

Non-Final Office Action received for U.S. Appl. No. 16/937,408, dated Feb. 3, 2022, 16 pages.

Notice of Allowance received for U.S. Appl. No. 16/937,408, dated Apr. 27, 2022, 11 pages.

\* cited by examiner

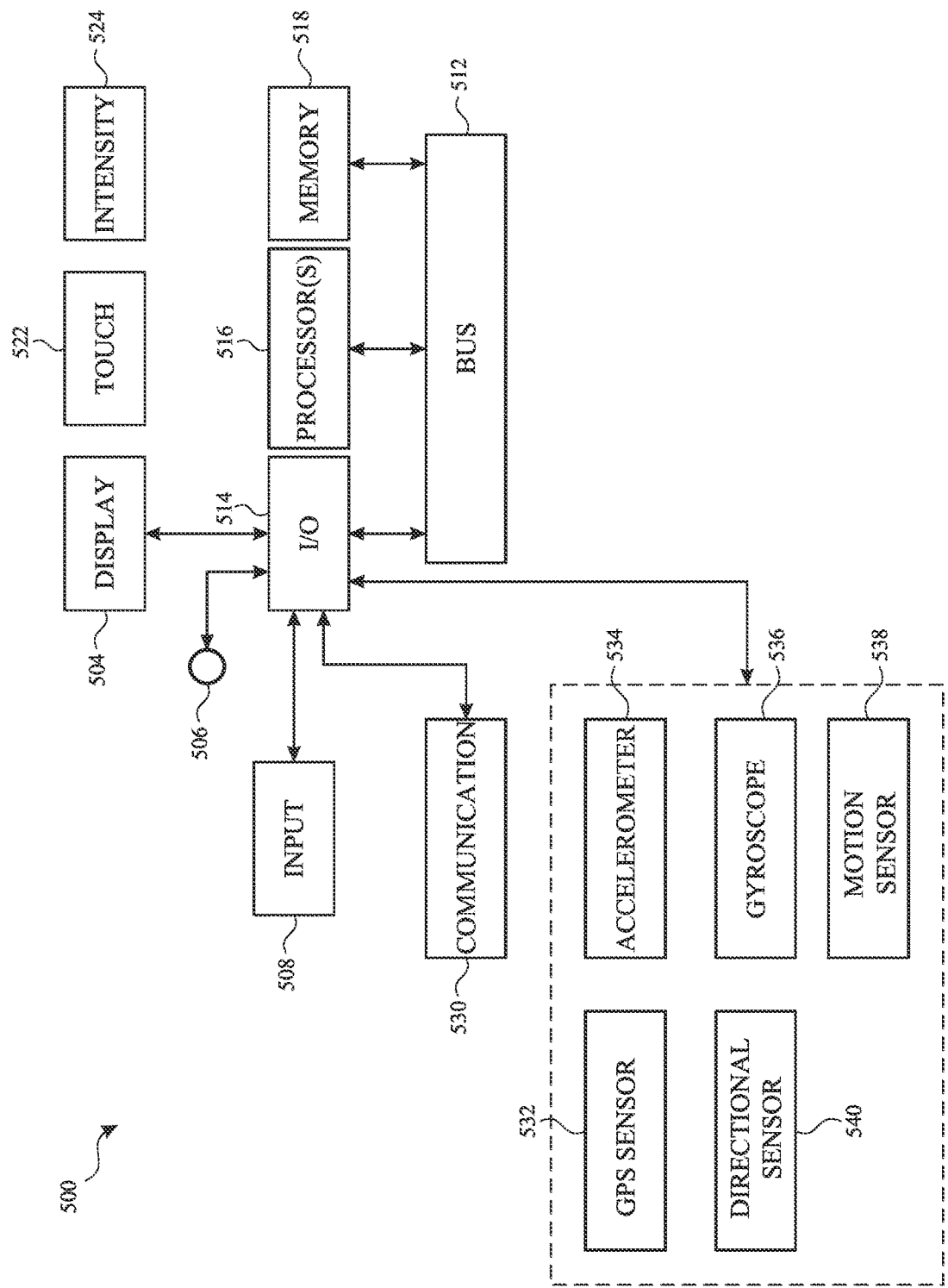

PROPAGATING CONTEXT INFORMATION IN A PRIVACY PRESERVING MANNER

CROSS-REFERENCE TO RELATED APPLICATIONS

This application is a continuation of U.S. Nonprovisional application Ser. No. 16/937,408, filed Jul. 23, 2020, entitled "PROPAGATING CONTEXT INFORMATION IN A PRIVACY PRESERVING MANNER", which claims the benefit of U.S. Provisional Application No. 62/971,643, filed Feb. 7, 2020, entitled "PROPAGATING CONTEXT INFORMATION IN A PRIVACY PRESERVING MANNER", and U.S. Provisional Application No. 62/885,082, filed Aug. 9, 2019, entitled "PROPAGATING CONTEXT INFORMATION IN A PRIVACY PRESERVING MANNER", the entire contents of which are hereby incorporated by reference.

FIELD

The present disclosure relates generally to context-aware electronic devices, and more specifically to techniques for propagating context information to another electronic device.

BACKGROUND

Users are increasingly using electronic devices in a variety of locations and while performing a variety of activities. For example, electronic devices can be used during work meetings, while at the gym, or while at home watching a movie.

BRIEF SUMMARY

Some electronic devices, however, are generally unaware of the location, activity, or other contexts associated with a user of the electronic device. Without context information, some actions with the electronic device require more time than necessary, wasting user time and device energy. For example, without accurate context information, the electronic device may interrupt a user during a meeting.

Accordingly, the present techniques provide electronic devices with context information, resulting in faster, more efficient methods and interfaces for utilizing the electronic devices. Such methods and interfaces optionally complement or replace other methods for determining context information with electronic devices. Such methods and interfaces reduce the cognitive burden on a user and produce a more efficient human-machine interface. For battery-operated computing devices, such methods and interfaces conserve power and increase the time between battery charges.

In some embodiments, a method is performed at a first electronic device. The method includes: determining a context associated with a user of the first electronic device; detecting a second electronic device satisfies a distance criterion with respect to the first electronic device; in response to detecting the second electronic device satisfies the distance criterion with respect to the first electronic device, determining whether propagation of the context to the second electronic device is permitted; in accordance with a determination that propagation of the context to the second electronic device is permitted and while the second electronic device satisfies the distance criterion with respect to the first electronic device, transmitting the context to the second electronic device; and in accordance with a determination that propagation of the context to the second electronic device is not permitted, forgoing transmission of the context to the second electronic device.

In some embodiments, a non-transitory computer-readable storage medium stores one or more programs configured to be executed by one or more processors of a first electronic device. The one or more programs include instructions for: determining a context associated with a user of the first electronic device; detecting a second electronic device satisfies a distance criterion with respect to the first electronic device; in response to detecting the second electronic device satisfies the distance criterion with respect to the first electronic device, determining whether propagation of the context to the second electronic device is permitted; in accordance with a determination that propagation of the context to the second electronic device is permitted and while the second electronic device satisfies the distance criterion with respect to the first electronic device, transmitting the context to the second electronic device; and in accordance with a determination that propagation of the context to the second electronic device is not permitted, forgoing transmission of the context to the second electronic device.

In some embodiments, a transitory computer-readable storage medium stores one or more programs configured to be executed by one or more processors of a first electronic device. The one or more programs include instructions for: determining a context associated with a user of the first electronic device; detecting a second electronic device satisfies a distance criterion with respect to the first electronic device; in response to detecting the second electronic device satisfies the distance criterion with respect to the first electronic device, determining whether propagation of the context to the second electronic device is permitted; in accordance with a determination that propagation of the context to the second electronic device is permitted and while the second electronic device satisfies the distance criterion with respect to the first electronic device, transmitting the context to the second electronic device; and in accordance with a determination that propagation of the context to the second electronic device is not permitted, forgoing transmission of the context to the second electronic device.

In some embodiments, a first electronic device includes one or more processors and memory. The memory stores one or more programs configured to be executed by the one or more processors. The one or more programs including instructions for: determining a context associated with a user of the first electronic device; detecting a second electronic device satisfies a distance criterion with respect to the first electronic device; in response to detecting the second electronic device satisfies the distance criterion with respect to the first electronic device, determining whether propagation of the context to the second electronic device is permitted; in accordance with a determination that propagation of the context to the second electronic device is permitted and while the second electronic device satisfies the distance criterion with respect to the first electronic device, transmitting the context to the second electronic device; and in accordance with a determination that propagation of the context to the second electronic device is not permitted, forgoing transmission of the context to the second electronic device.

In some embodiments, a first electronic device includes: means for determining a context associated with a user of the first electronic device; means for detecting a second electronic device satisfies a distance criterion with respect to the first electronic device; means for, in response to detecting the second electronic device satisfies the distance criterion with respect to the first electronic device, determining whether propagation of the context to the second electronic device is permitted; means for, in accordance with a determination that propagation of the context to the second electronic device is permitted and while the second electronic device satisfies the distance criterion with respect to the first electronic device, transmitting the context to the second electronic device; and means for, in accordance with a determination that propagation of the context to the second electronic device is not permitted, forgoing transmission of the context to the second electronic device.

In some embodiments, a method is performed at a first electronic device associated with a first user. The method includes: identifying first context-related information; receiving second context-related information from a second electronic device, wherein the second electronic device is associated with the first user; determining a context associated with the first user based on the first context-related information and the second context-related information; and transmitting the context to the second electronic device.

In some embodiments, a non-transitory computer-readable storage medium stores one or more programs configured to be executed by one or more processors of a first electronic device associated with a first user. The one or more programs include instructions for: identifying first context-related information; receiving second context-related information from a second electronic device, wherein the second electronic device is associated with the first user; determining a context associated with the first user based on the first context-related information and the second context-related information; and transmitting the context to the second electronic device.

In some embodiments, a transitory computer-readable storage medium stores one or more programs configured to be executed by one or more processors of a first electronic device associated with a first user. The one or more programs include instructions for: identifying first context-related information; receiving second context-related information from a second electronic device, wherein the second electronic device is associated with the first user; determining a context associated with the first user based on the first context-related information and the second context-related information; and transmitting the context to the second electronic device.

In some embodiments, a first electronic device associated with a first user includes one or more processors and memory. The memory stores one or more programs configured to be executed by the one or more processors. The one or more programs including instructions for: identifying first context-related information; receiving second context-related information from a second electronic device, wherein the second electronic device is associated with the first user; determining a context associated with the first user based on the first context-related information and the second context-related information; and transmitting the context to the second electronic device.

In some embodiments, a first electronic device associated with a first user includes: means for identifying first context-related information; means for receiving second context-related information from a second electronic device, wherein the second electronic device is associated with the first user; means for determining a context associated with the first user based on the first context-related information and the second context-related information; and means for transmitting the context to the second electronic device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, electronic devices are provided with faster, more efficient methods and interfaces when utilized, thereby increasing the effectiveness, efficiency, and user satisfaction with such devices. Such methods and interfaces may complement or replace other methods for utilizing the electronic device.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 5B is a block diagram illustrating a personal electronic device in accordance with some embodiments.

DESCRIPTION OF EMBODIMENTS

Figure 1A:
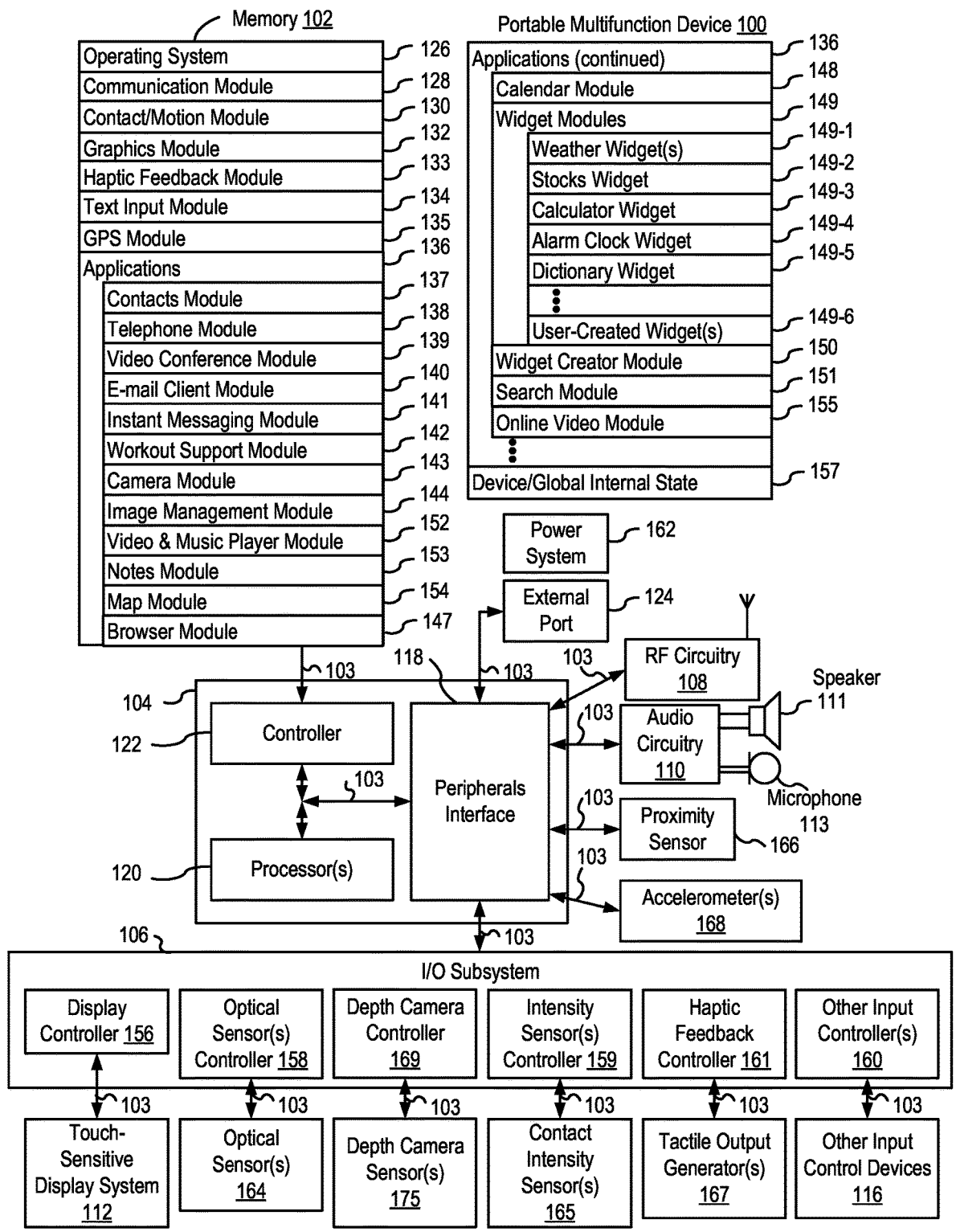
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices to utilize context information in order for a user to more efficiently operate the device. For example, without context information, the electronic device may provide notifications to a user while the user is in a meeting, thus interrupting the meeting and taking time away from the user. However, in some cases, an electronic device may not have access to current or accurate context information. In these cases, the electronic device receives context information from another device with more accurate or current context information.

Below, FIGS. 1A-1B, 2, 3, 4A-4B, and 5A-5B provide a description of exemplary devices that utilize context information. FIGS. 6A-6G illustrate examples of propagating context information between electronic devices. FIG. 7 is a flow diagram illustrating methods of propagating context information, in accordance with some embodiments. The examples in FIGS. 6A-6G are used to illustrate the processes described below, including the processes in FIG. 7.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
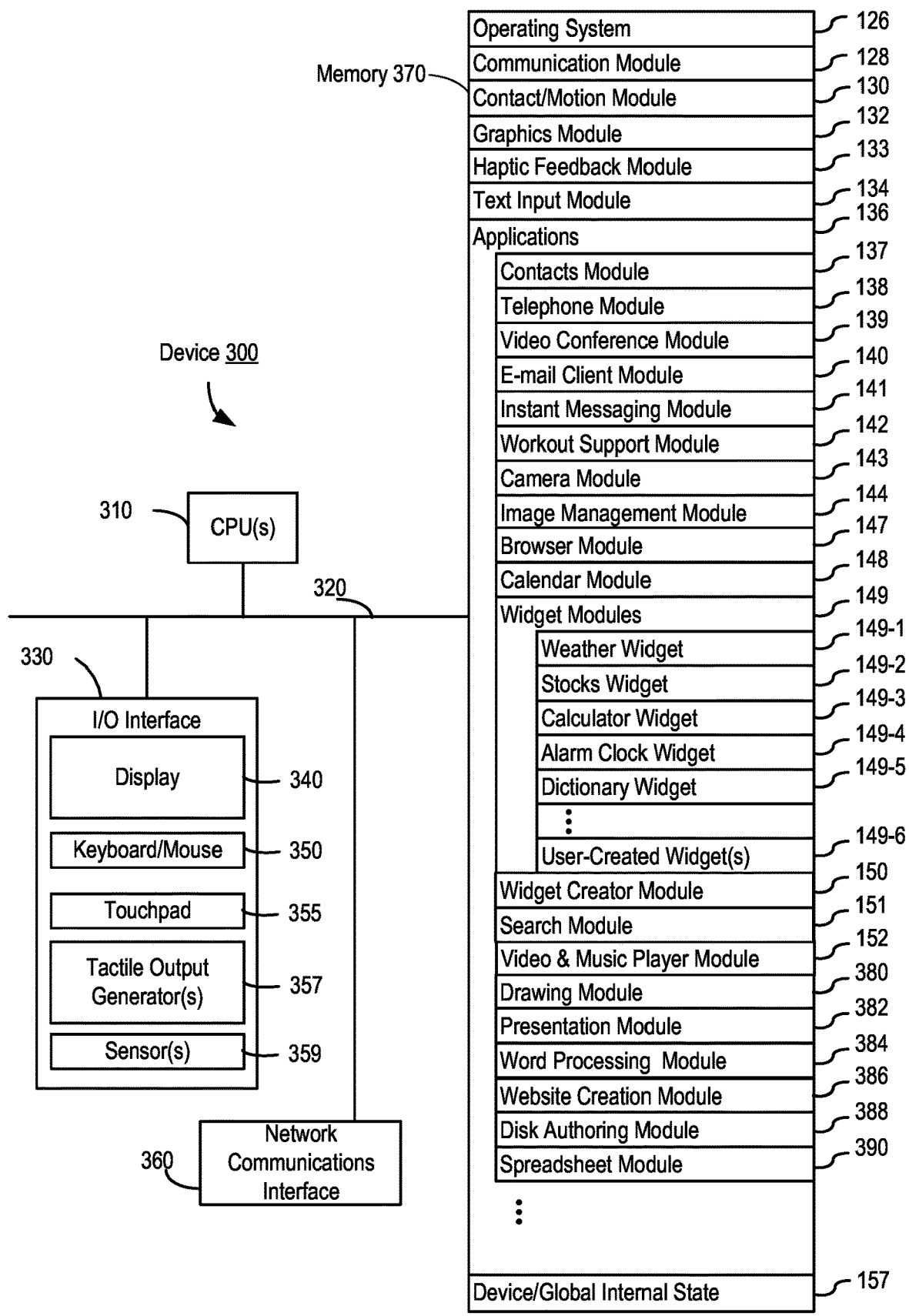
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;

Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
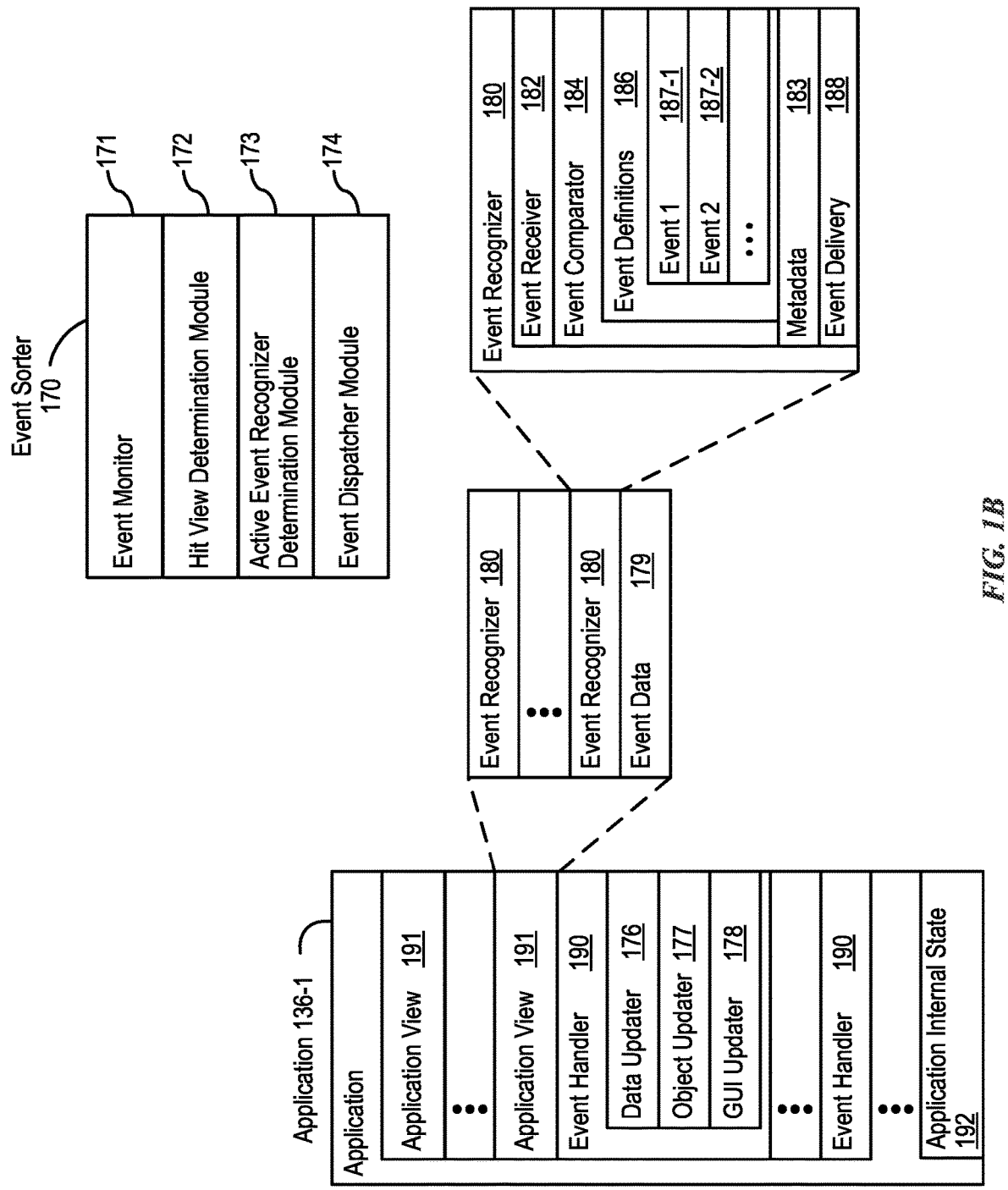
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
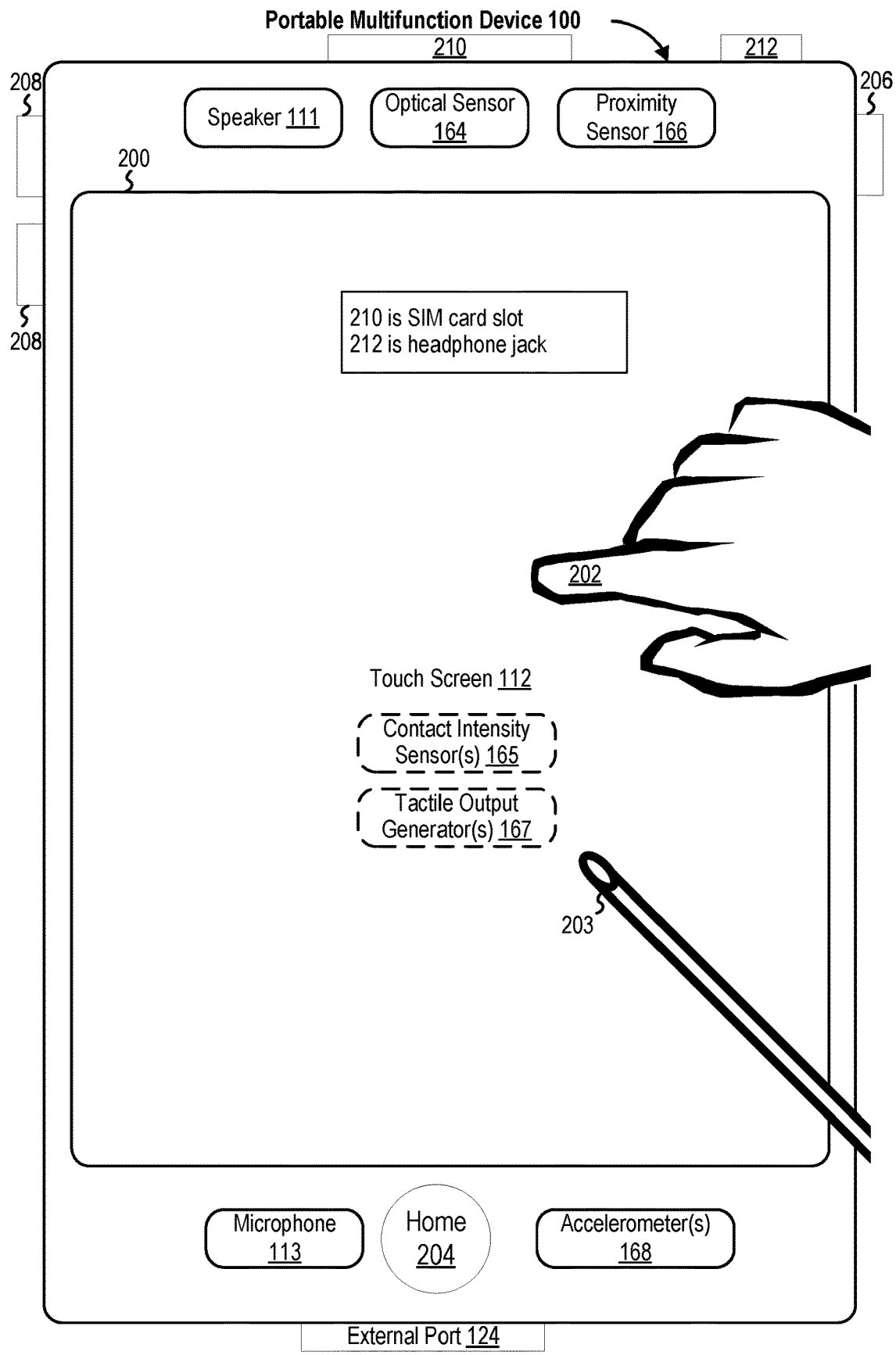
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
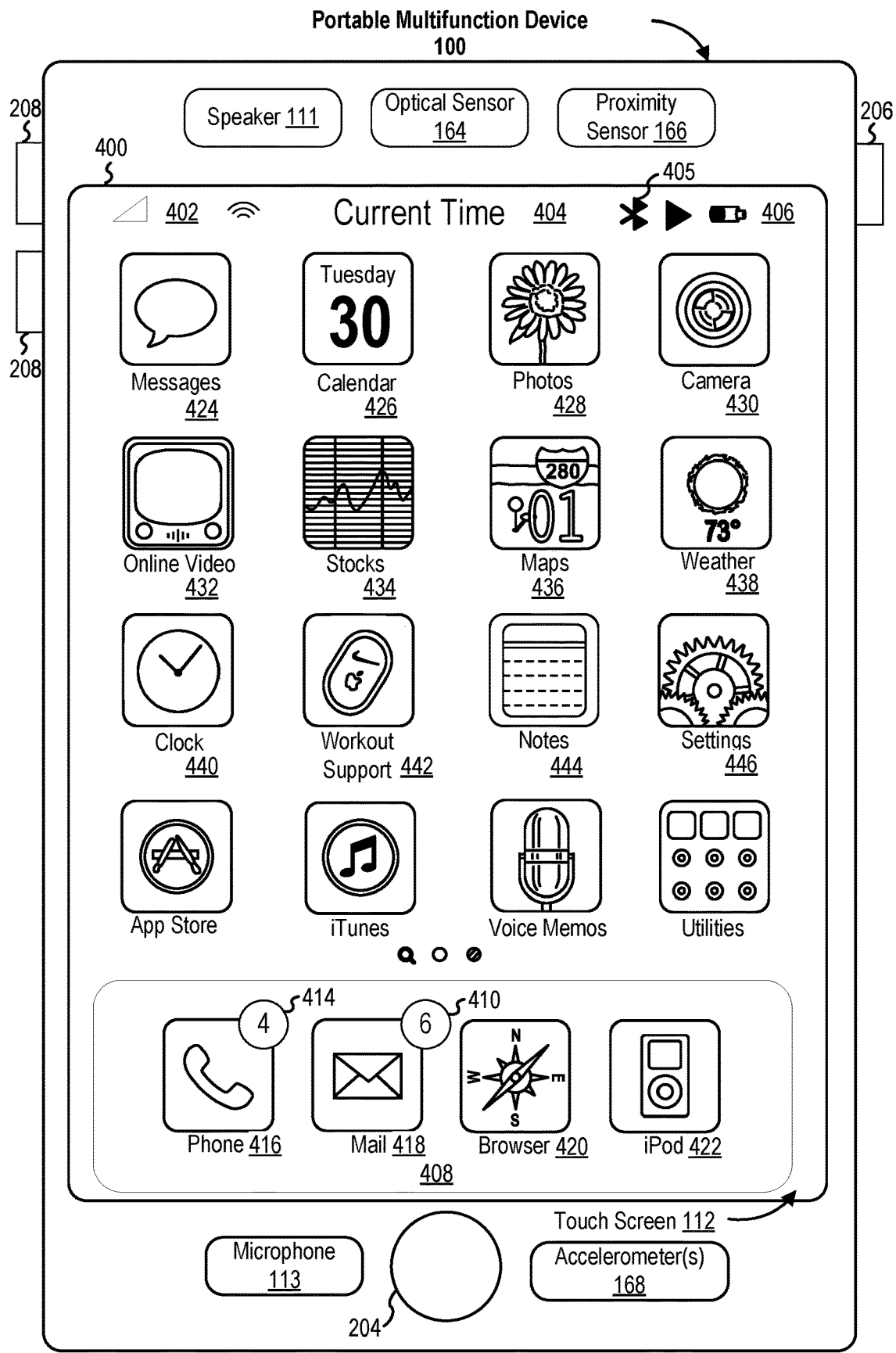
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:
- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
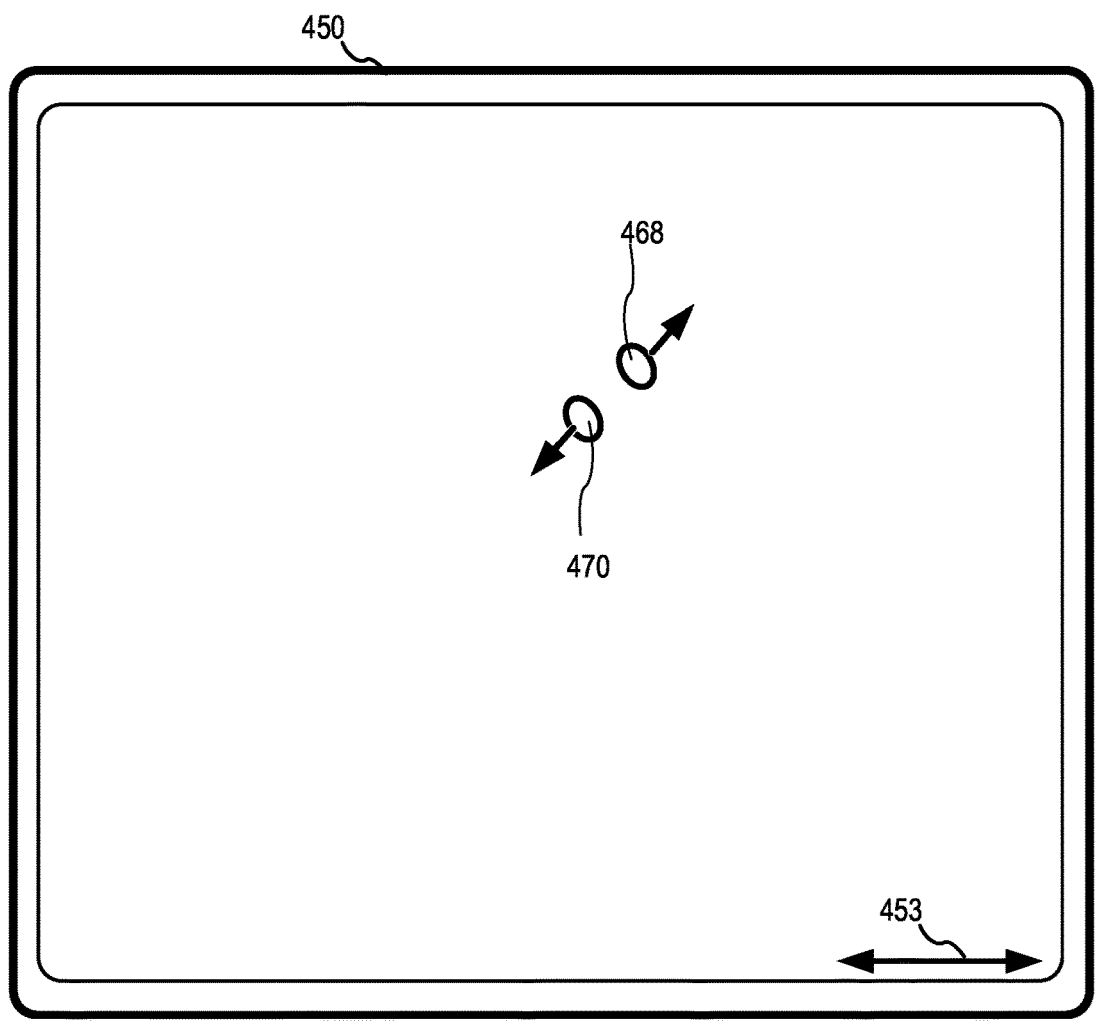
FIG. 4B illustrates an exemplary user interface for a multifunction device with a touch-sensitive surface that is separate from the display in accordance with some embodiments.
Figure 4B:
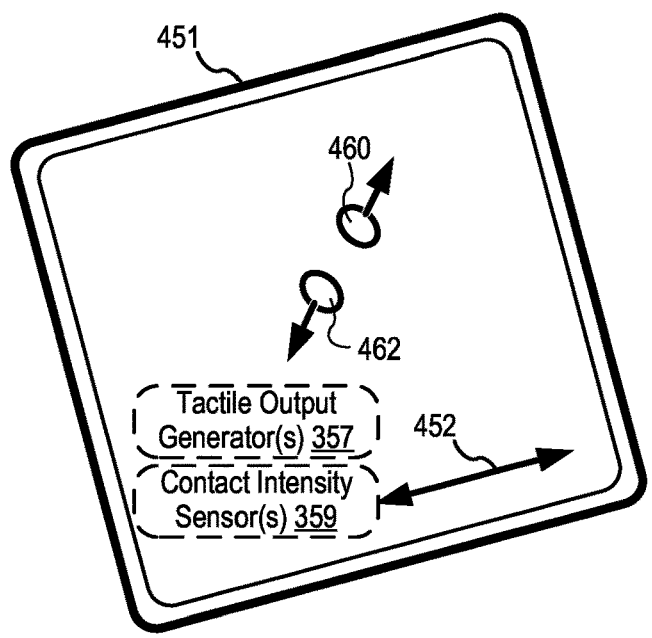

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
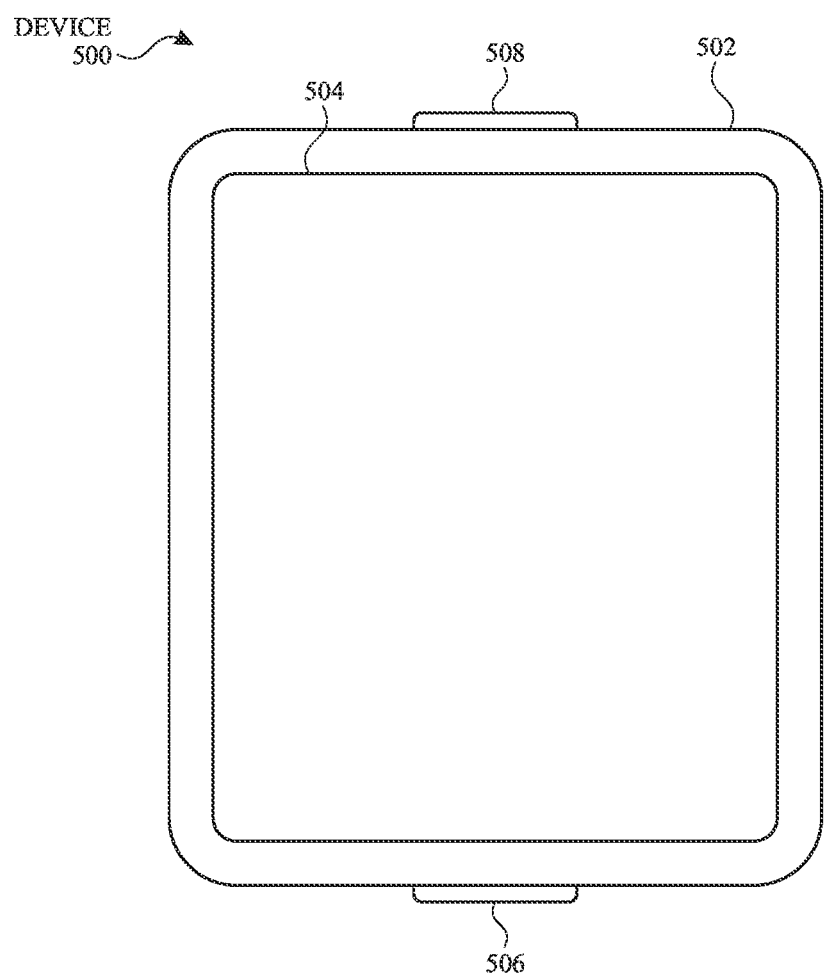
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards examples of propagating context information and associated processes that are implemented on an electronic device, such as portable multifunction device 100, device 300, or device 500.

FIGS. 6A-6G illustrate examples of propagating context from a first electronic device to a second electronic device, in accordance with some embodiments. The examples in these figures are used to illustrate the processes described below, including the processes in FIGS. 7 and 8.

Figure 6A:
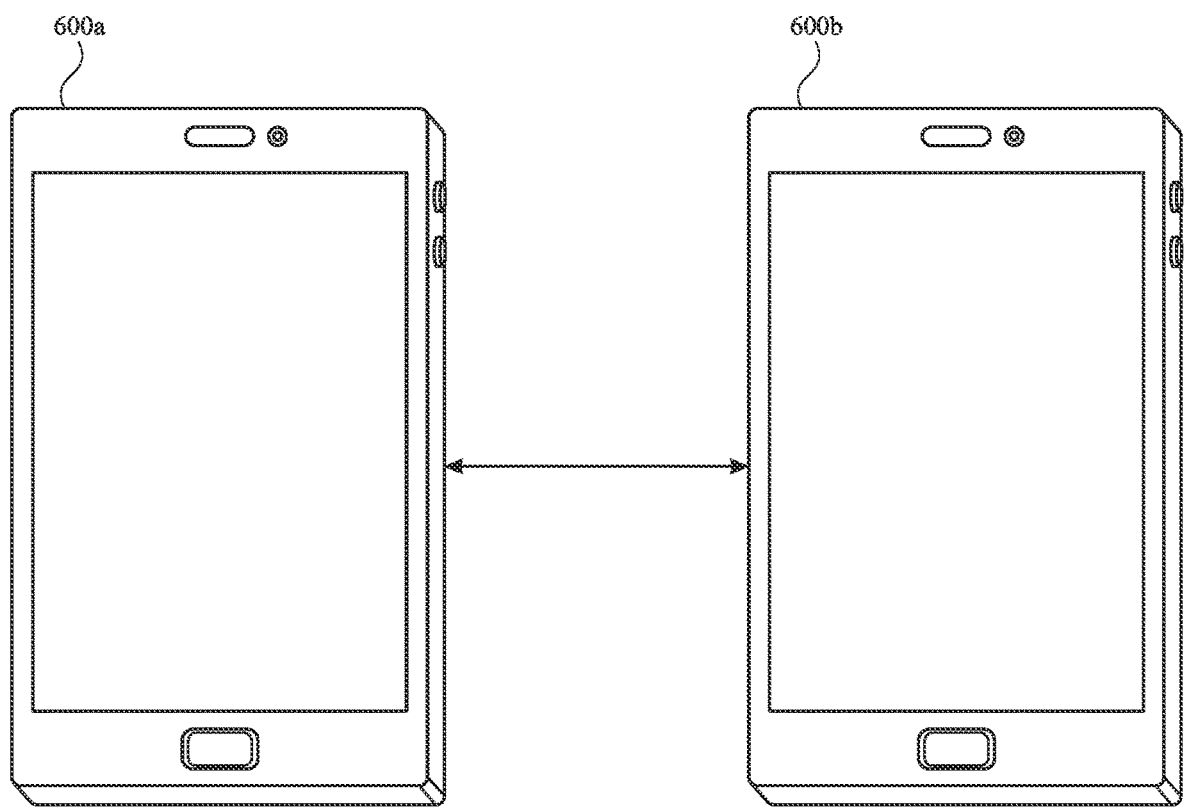
FIGS. 6A-6G illustrate examples of propagating context from a first electronic device to a second electronic device in accordance with some embodiments.
Figure 7:
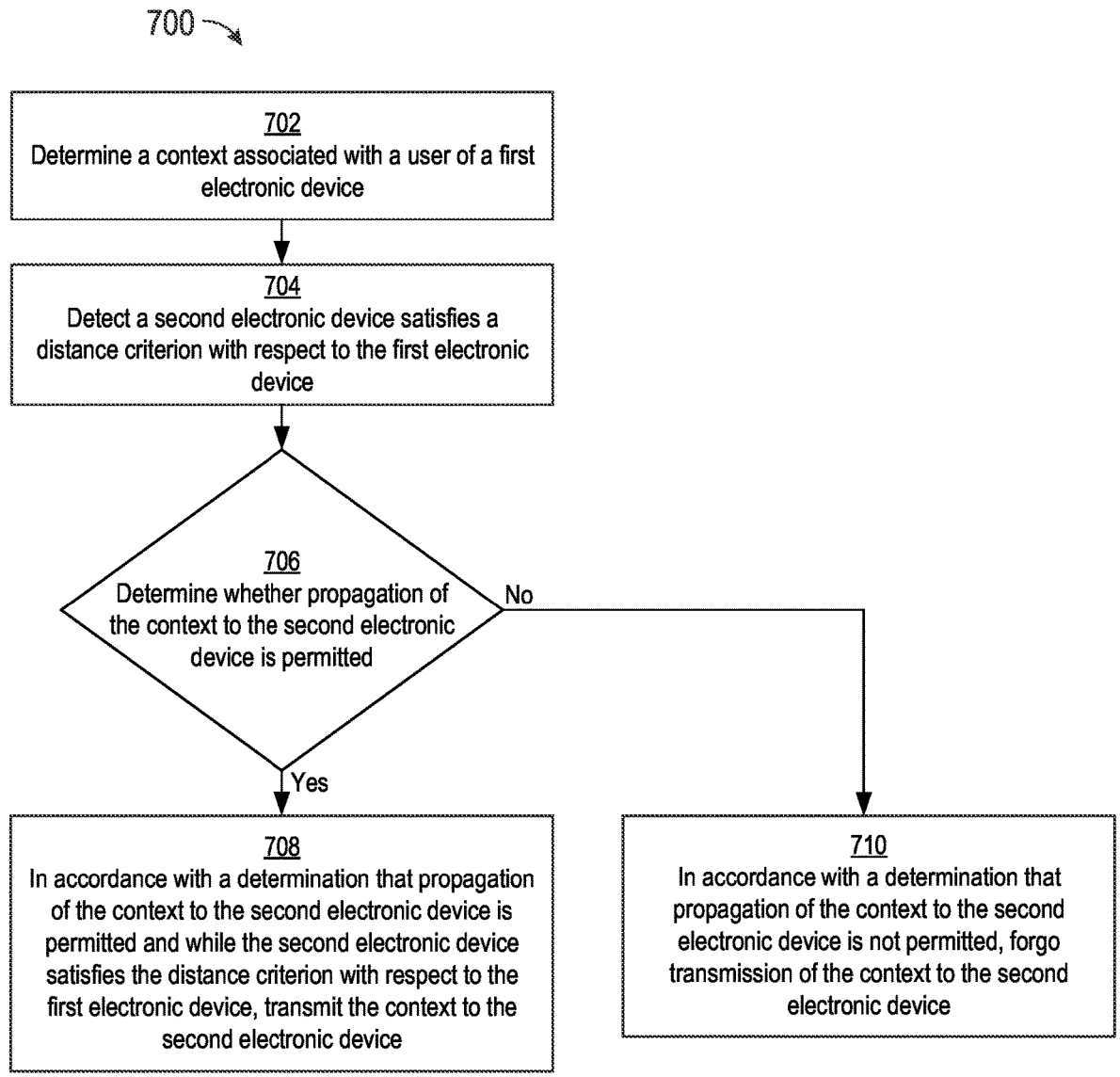
FIG. 7 is a flow diagram illustrating a method for propagating context information using an electronic device in accordance with some embodiments.

FIG. 6A illustrates a first electronic device 600*a* in communication with a second electronic device 600*b*. In some embodiments, electronic devices 600*a* and 600*b* include one or more features of devices 100, 300, or 500. While electronic devices 600*a* and 600*b* are illustrated as portable multifunction devices with touch-sensitive displays, it should be understood that first electronic device 600*a* and/or second electronic device 600*b* can be other types of electronic device, such as a watch or other wearable device, or a remotely located server.

First electronic device 600*a* is configured to determine a context (e.g., location, activity, status) associated with a user of the first electronic device 600*a* (e.g., a user signed into or registered with the first electronic device 600*a*). Examples of contexts include the location of the user (e.g., "home", "work", "gym"), an activity the user is engaging in (e.g., "driving", "traveling in a ride-share vehicle", "walking", "swimming"), or an event the user is attending (e.g., "in a meeting", "at a concert", "at a family event"). In some embodiments, contexts are determined based on sensor data (e.g., GPS, accelerometers, light sensors, pressure sensors), calendar information, email information, and/or other data sources accessible by the electronic devices 600*a* and 600*b*. For example, when first electronic device 600*a* detects its current location corresponds to a home address of the user (such as with GPS), a location context for the user is set to "at home". When first electronic device 600*a* detects its current location changes to a work address of the user, the location context for the user is changed to "at work". In some embodiments, first electronic device 600*a* determines multiple contexts associated with the user. For example, when first electronic device 600*a* detects its current location corresponds to the work address of the user and calendar information indicates the user is scheduled to be in a meeting, the context for the user is set to "at work" and "in a meeting".

When first electronic device 600*a* satisfies a distance criterion with respect to second electronic device 600*b* (e.g., when first electronic device 600*a* is within Bluetooth range of second electronic device 600*b*), first electronic device 600*a* may propagate one or more contexts to second electronic device 600*b* if context propagation is permitted. If propagation of the context to the second electronic device 600*b* is not permitted, then electronic device 600*a* forgoes transmission, whether the second electronic device 600*b* satisfies the distance criterion or not. Contexts that are permitted to be propagated can include contexts without private information (e.g., a location context corresponding to a public space) and contexts that have been approved for sharing (e.g., an activity context (e.g., "in a meeting") that the user has indicated can be shared with approved contacts). In some embodiments, the context is propagated from the first electronic device 600a to the second electronic device 600b using wireless communication (e.g., Bluetooth, Wi-Fi).

Figure 6B:
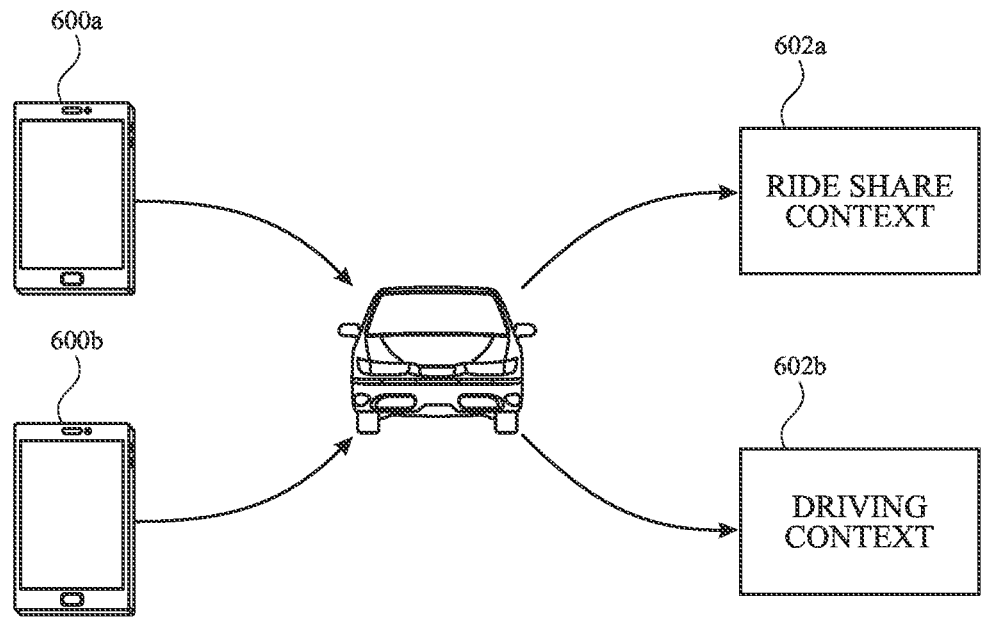
Figure 6C:
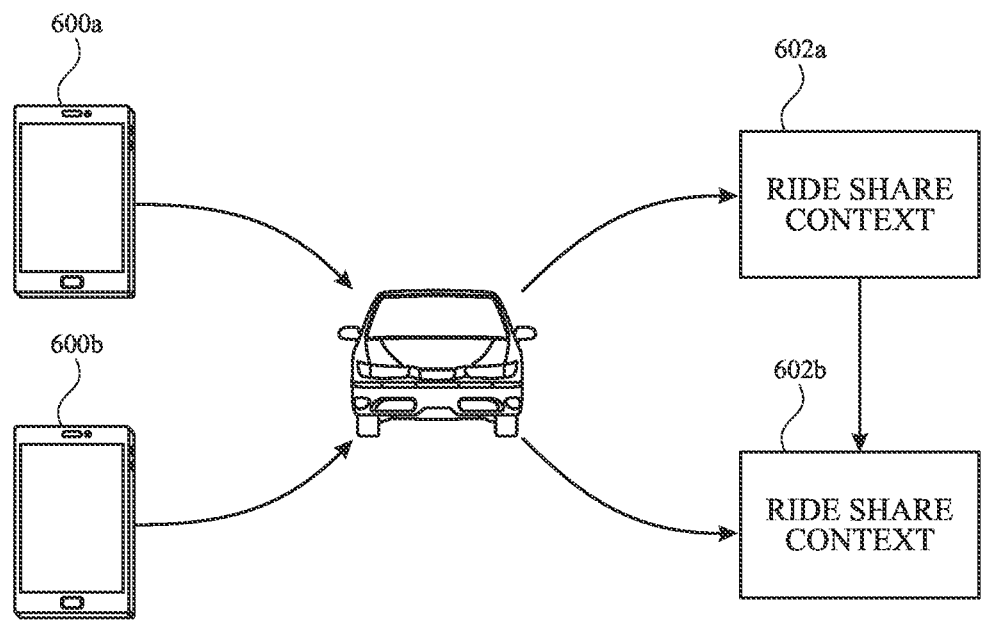
Figure 6D:
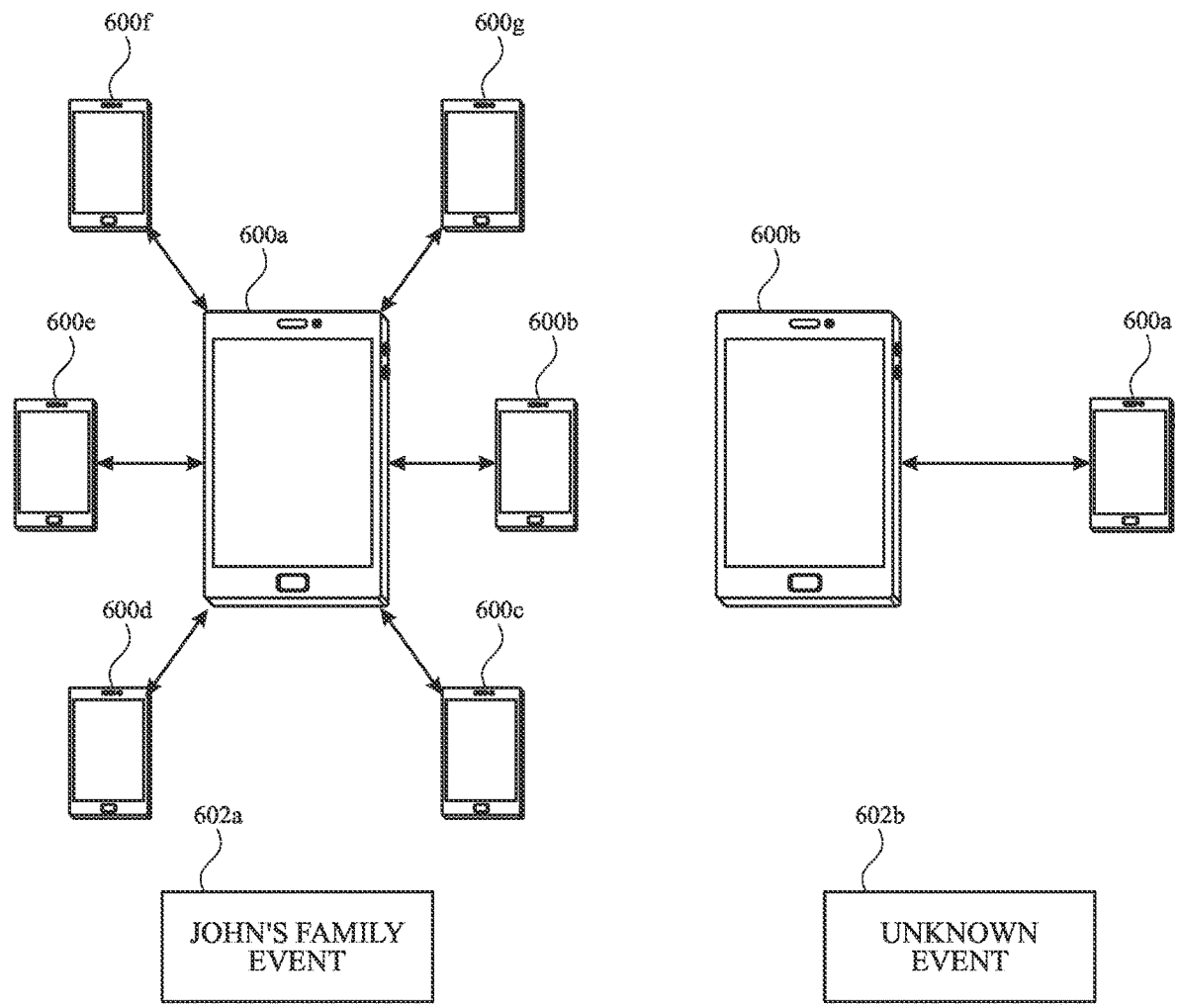
Figure 6E:
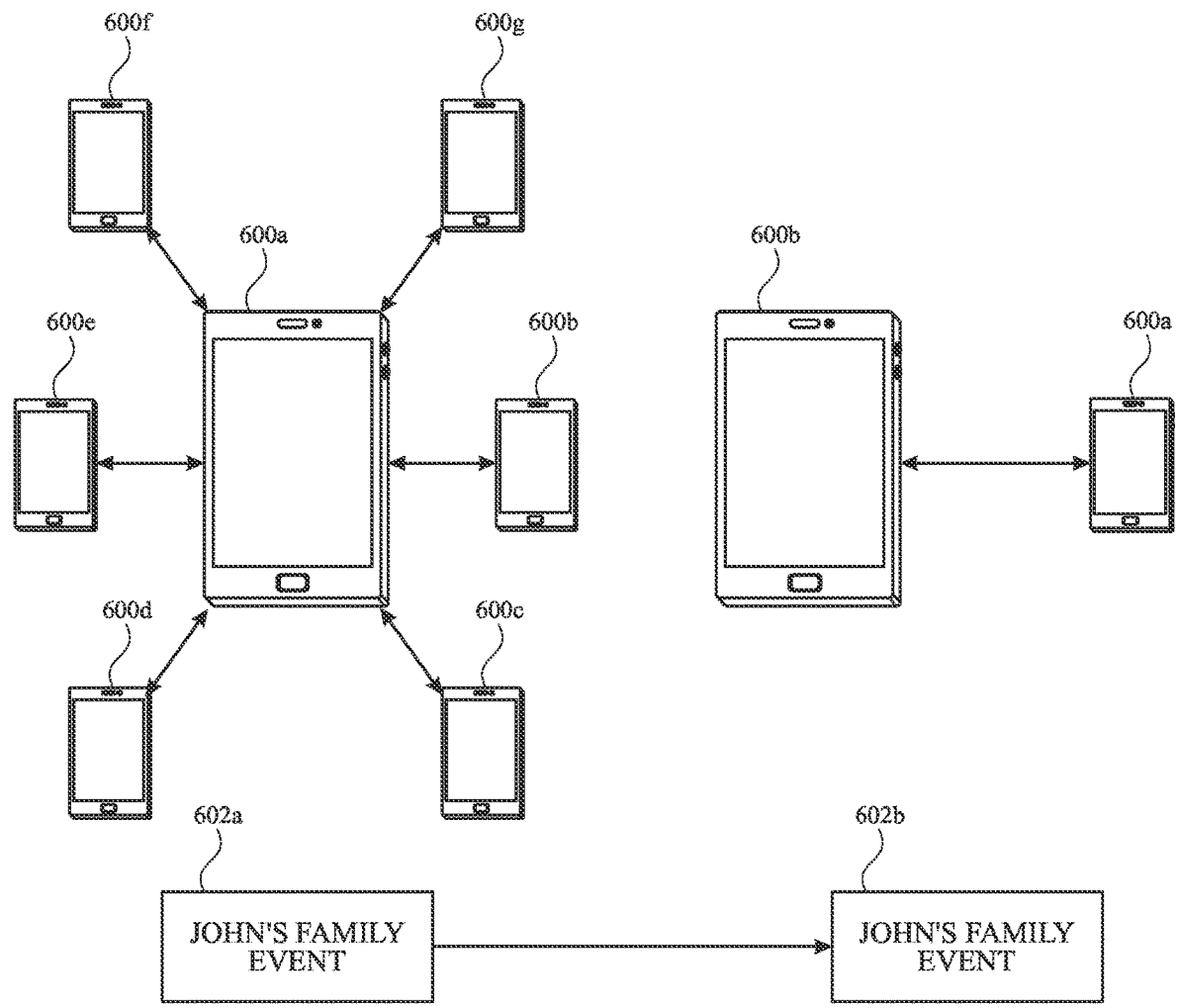
Figure 6F:
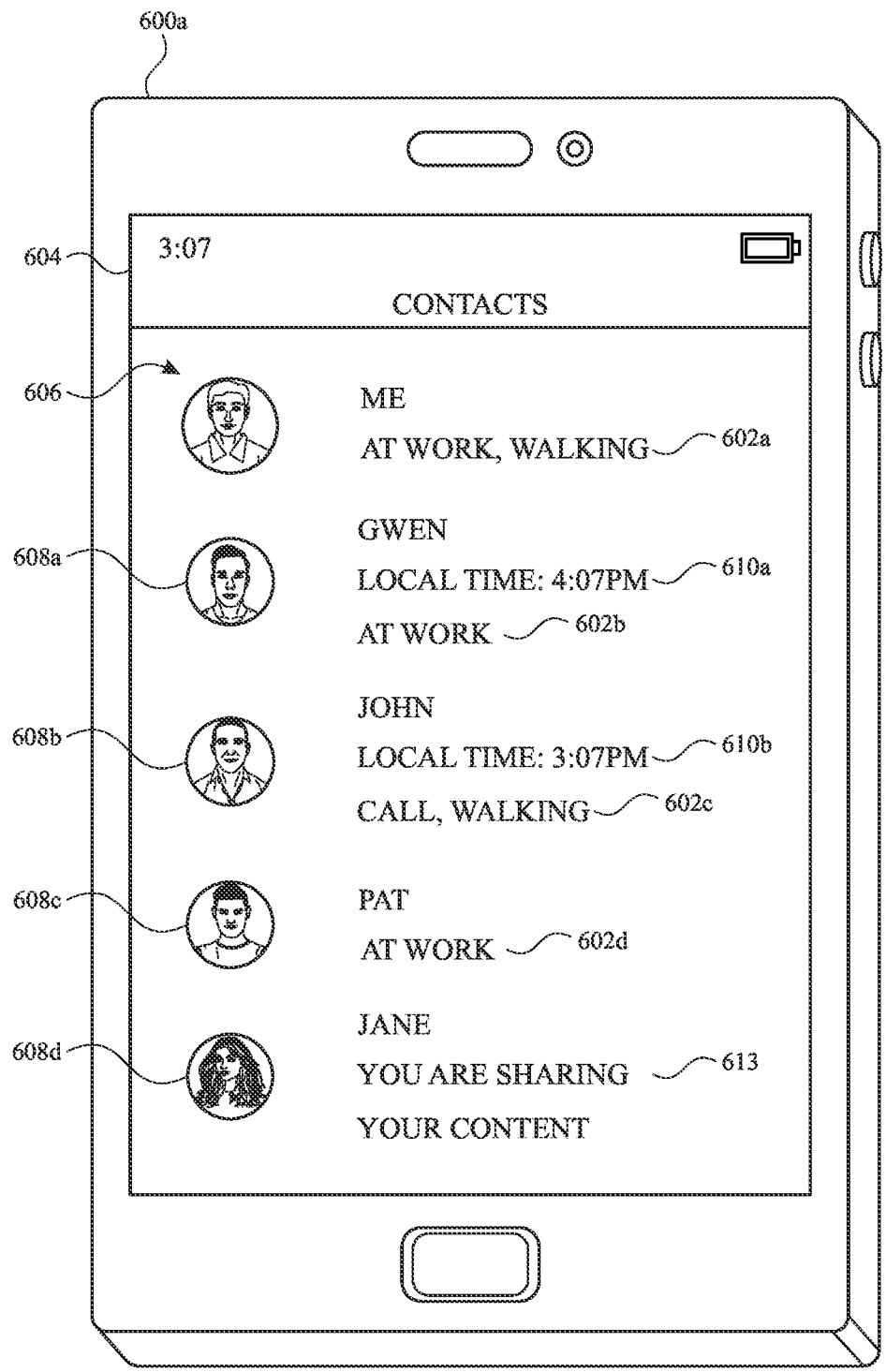
Figure 6G:
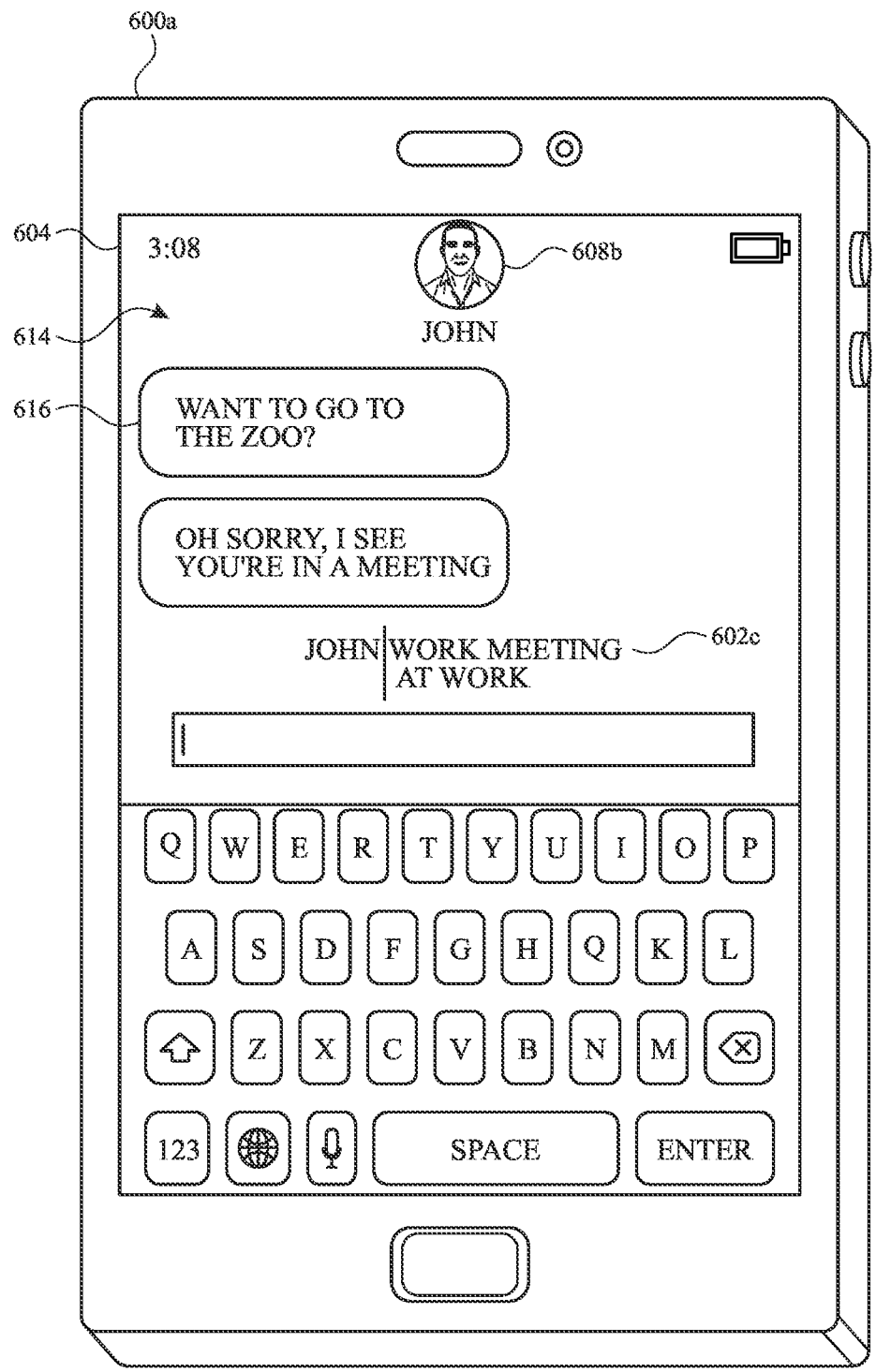

In some embodiments, after second electronic device 600b has received the context from first electronic device 600a, second electronic device 600b displays a current status for the user of the first electronic device 600a based on the received context (e.g., "User 1 is at work") (e.g., 602b-602d as shown in FIG. 6F) (e.g., 602c as shown in FIG. 6G). In some embodiments, after second electronic device 600b has received the context from first electronic device 600a, at least one context associated with a user of the second electronic device 600b (e.g., a user signed into or registered with the second electronic device 600b) is set based on the received context (e.g., the location of the second electronic device 600b is determined based on a location context propagated from the first electronic device 600a). In some embodiments, second electronic device 600b has a pre-existing context for the same category of contexts as the context received from the first electronic device (e.g., second electronic device 600b has a location context set to "in Miami"). Before the second electronic device 600b sets a context based on the context received from the first electronic device 600ba, a confidence value of the pre-existing context is compared to a confidence value of the received context, and the context is set to correspond to the context with a higher confidence value. For example, when the first electronic device 600a has a more accurate location sensor that identifies the current location as a specific business in Miami, then the second electronic device 600b updates its location context to correspond to the specific business. As another example, when the electronic devices 600a and 600b determine different activity contexts (e.g., a portable phone identifies the context as "walking" and a watch determines the context as "swimming"), second electronic device 600b uses the context with a higher confidence value (e.g. the watch has additional sensors to detect swimming, and thus has a higher confidence value for the current activity). In some embodiments, when electronic devices 600a and 600b include the same types of sensors for determining a context (e.g., both devices have GPS for determining a location context), the electronic device having a sensor with a higher performance metric (e.g., more efficient, more accurate) is used for determining the context. In some embodiments, when first electronic device 600a and second electronic device 600b are associated with the same user (e.g., first electronic device 600a is a phone associated with a first user and second electronic device 600b is a watch associated with the same first user), private context information may be propagated between the electronic devices 600a and 600b (e.g., private location information, private activity information). In some embodiments, context information is propagated between electronic devices 600a and 600b associated with the same user whether the electronic devices 600a and 600b satisfy the distance criterion or not (e.g., context information is propagated between devices associated with the same user when the devices are not physically near each other).

In some embodiments, propagation of the context to the second electronic device is permitted when a relationship criterion for the users associated with the first and second electronic devices is satisfied (e.g., when the users are in each other's contact lists). In some embodiments, the user of the first electronic device 600a is also associated with the second electronic device 600b (e.g., the first electronic device 600a is portable phone and the second electronic device 600b is a watch paired with the portable phone). When the electronic devices 600a and 600b are associated with the same user, then the relationship criterion is satisfied. In some embodiments, when the relationship criterion is satisfied and the electronic devices 600a and 600b are within the threshold distance, the context is automatically propagated from the first electronic device 600a to the second electronic device 600b.

In some embodiments, first electronic device 600a gathers context-related information (e.g., sensor data and/or contexts) from other devices (e.g., second electronic device 600b and/or other additional devices) and determines a context for a user based on the gathered context-related information. In some embodiments, first electronic device 600a is a server remotely located from second electronic device 600b and/or other additional devices. In some embodiments, the gathered context-related information includes context-related information determined at the first electronic device 600a. In some embodiments, first electronic device 600a determines the context by combining the gathered context-related information. In some embodiments, first electronic device 600a determines the context by comparing confidence values of the gathered context-related information and using the context-related information with a highest confidence value to determine the context. The context based on the gathered context-related information is then distributed to the second electronic device 600b and/or other devices that previously shared context-related information with first electronic device 600a.

In some embodiments, first electronic device 600a and second electronic device 600b (and/or additional devices) include sensors of a first type (e.g., location sensor, light sensor, motion sensor) and the gathered context-related information includes sensor data from each of the sensors of the first type. For example, when the first electronic device 600a and the second electronic device 600b both include location sensors, a location context can be determined with a higher confidence by using the location data from both devices than a location context determined using location data from only one device.

In some embodiments, first electronic device 600a includes a sensor of a first type (e.g., location sensor, light sensor, motion sensor) and second electronic device 600b includes a sensor of a second type different from the first type, and the first electronic device 600a determines a context by using the data from both sensors. For example, the sensor in the first electronic device 600a may be a location sensor and the sensor in the second electronic device 600b may be a motion sensor. If the location sensor in first electronic device 600a indicates rapidly changing locations, and the motion sensor indicates motion associated with driving, then the first electronic device 600a determines the context of the first user is "driving".

In some embodiments, context-related information includes a preliminary context from a contextual category (e.g., location, activity, status). In some embodiments, first electronic device 600a determines a first preliminary context from a first contextual category (e.g., activity), and second electronic device 600b determines a second preliminary context from the same first contextual category (e.g., activity). After gathering the second preliminary context from second electronic device 600b, first electronic device determines a context based on both the first preliminary context and the second preliminary context. For example, if the first preliminary context is a swimming activity and the second preliminary context is a sitting activity, then the context is determined based on which activity is likely to be more accurate (e.g., the preliminary context with a higher confidence value).

In some embodiments, the second preliminary context determined by second electronic device 600b is from a different contextual category than the first preliminary context determined by first electronic device 600a. For example, the first preliminary context may be an activity (e.g., swimming) while the second preliminary context may be a location (e.g., gym). After gathering the second preliminary context from second electronic device 600b, first electronic device determines a context based on both the first preliminary context and the second preliminary context (e.g., swimming at the gym).

In some embodiments, both the first electronic device 600a and the second electronic device 600b gather context-related information from the other device and/or other additional devices. Both the first electronic device 600a and the second electronic device 600b then determine a context based on the gathered context-related information. In these embodiments, no transmission of a determined context to other devices is necessary.

In some embodiments, first electronic device 600a and second electronic device 600b (and additional devices, if any) negotiate which device is to gather the context-related information and determine the context. In some embodiments, the device that is selected to gather the context-related information is more capable (e.g., has a faster processing speed, has a faster network speed) than other devices. If the most capable device is not available, then the next most capable device is used to gather the context-related information and determine the context.

FIGS. 6B and 6C illustrate an example of context propagation between first electronic device 600a and second electronic device 600b. As shown in FIG. 6B, both electronic devices 600a and 600b enter an automobile. First electronic device 600a detects a first user associated with the first electronic device 600a has requested a ride share, and sets its context 602a to "ride share". Second electronic device 600b detects a second user associated with the second electronic device 600b is traveling in an automobile, and initially sets its context to "driving", since the second user did not request a ride share, as shown in FIG. 6B.

While the first and second electronic devices 600a and 600b satisfy the distance criterion (e.g., the devices are traveling in the automobile together) and if the first user associated with first electronic device 600a satisfies a relationship criterion with the second electronic device 600b (e.g., the first user is in the contact list of the second electronic device 600b, indicating the first user and the second user know each other), then the "ride share" context 602a of the first electronic device 600a propagates to the second electronic device 600b, as shown in FIG. 6C. This allows second electronic device 600b to have a more accurate context, even though second electronic device 600b did not request the ride share.

FIGS. 6D and 6E illustrate another example of context propagation between first electronic device 600a and second electronic device 600b. As shown in FIG. 6D, first electronic device 600a satisfies a distance criterion with respect to second electronic device 600b (e.g., first and second electronic devices 600a and 600b are in the same room of a building). First electronic device 600a also satisfies a distance criterion with respect to other electronic devices 600c-600g. Electronic devices 600c-600g are associated with users that first electronic device 600a identifies as members of John's family (e.g., the users associated with electronic devices 600c-600g satisfy a relationship criterion of first electronic device 600a). Based on identifying members of John's family, first electronic device 600a sets an activity context 602a to "John's family event". The users associated with electronic devices 600c-600g do not satisfy a relationship criterion of second electronic device 600b (e.g., the users associated with electronic devices 600c-600g are not in a contact list of second electronic device 600b). Thus, second electronic device 600b only recognizes first electronic device 600a and initially has an unknown activity context 602b, as shown in FIG. 6D.

While the first and second electronic devices 600a and 600b satisfy the distance criterion (e.g., the devices in the same room of a building) and if the first user associated with first electronic device 600a satisfies a relationship criterion with the second electronic device 600b (e.g., the first user is in the contact list of the second electronic device 600b, indicating the first user and the second user know each other), then the "John's family event" context 602a of the first electronic device 600a propagates to the second electronic device 600b, as shown in FIG. 6E. This allows second electronic device 600b to have a more accurate context, even though the other users of electronic devices 600c-600g do not satisfy the relationship criterion of second electronic device 600b.

FIG. 6F illustrates an example of contacts user interface 606 displayed on display 604 of electronic device 600a. Contacts user interface 606 includes contacts 608a-608d. When context information is available for a contact or for a user of electronic device 600a, context information 602a-602d is displayed. For example, context information 602a is displayed for the user associated with the electronic device 600a and context information 602b is displayed for contact 608a. Context information 602b is received from an electronic device associated with the contact 608a (e.g., second electronic device 600b as shown in FIG. 6A). In some embodiments, context information 602b-602d for one or more contacts 608a-608c is received in response to the electronic device 600a being in proximity to (e.g., satisfying a distance criterion) an electronic device associated with the respective contact. In some embodiments, context information 602b-602d for one or more contacts 608a-608c is received from electronic devices associated with contacts that satisfy a relationship criterion with the user of first electronic device 600a and that have agreed to share their context information. In some embodiments, a current time 610a at a location of a contact 608b is displayed. The current time at the location of the contact may be different than the current time of the electronic device 600a. Providing context information 610a-b and 602b-d in contacts user interface 606 advantageously allows the user of first electronic device 600a to determine whether to contact a particular user and what means of communication is most appropriate. For example, if the local time for a particular contact is late at night, the user of first electronic device 600a may decide against calling that contact. If the context for a particular contact is "attending work meeting," then the user of first electronic device 600a may decide to email that contact rather than call or text that contact.

In some embodiments, a notification 613 is displayed when sharing of context information is enabled for a contact (e.g., contact 608d). The notification 613 indicates that the contact is receiving context information about the user associated with electronic device 600a.

FIG. 6G illustrates an example of a messaging interface 614 displayed on display 604 of electronic device 600a. Messaging interface 614 includes one or more messages 616 sent to a contact 608b. Messaging interface 614 also includes context information 602c for contact 608b. In some embodiments, context information 602c is received from an electronic device associated with contact 608b when the contact has selected the context information 602c to be shared. Providing context information 602c in messaging interface 614 advantageously allows the user of first electronic device 600a to better understand the communication behavior of contact 608b. For example, if contact 608b does not respond to message 616 for an extended period of time, context information 602b allows the user of electronic device 600a to infer that contact 608b cannot respond because he is in a work meeting.

FIG. 7 is a flow diagram illustrating a method for propagating context information using an electronic device in accordance with some embodiments. Method 700 is performed at an electronic device (e.g., 100, 300, 500, 600a, 600b). Some operations in method 700 are, optionally, combined, the orders of some operations are, optionally, changed, and some operations are, optionally, omitted.

As described below, method 700 provides an intuitive way for propagating context information. The method reduces the cognitive burden on a user by setting a context without additional user input, thereby creating a faster and more efficient human-machine interface. For battery-operated computing devices, enabling the electronic device to determine a context of a user associated with the electronic device without additional user input conserves power and increases the time between battery charges.

At block 702, a first electronic device (e.g., 602a) (e.g., phone of a first user, watch) determines a context (e.g., location, activity, status) associated with a user of the first electronic device (e.g., a user signed into or registered with the first electronic device).

At block 704, the first electronic device detects that a second electronic device (e.g., 602b) (e.g., phone of a second user, phone paired with watch) satisfies a distance criterion with respect to the first electronic device (e.g., in same building, in same room, in same vehicle, in Bluetooth range).

At block 706, in response to detecting the second electronic device satisfies the distance criterion with respect to the first electronic device, the first electronic device determines whether propagation of the context to the second electronic device is permitted.

At block 708, in accordance with a determination that propagation of the context to the second electronic device is permitted (e.g., context does not include private information, context has been approved for sharing, or devices are associated with the same user) and while the second electronic device satisfies the distance criterion with respect to the first electronic device, the first electronic device transmits the context to the second electronic device (e.g., via Bluetooth, WiFi). In some embodiments, in accordance with a determination that the second electronic device satisfies the distance criterion with respect to the first electronic device and in accordance with a determination that propagation of the context to the second electronic device is permitted, the first electronic device transmits the context to the second electronic.

At block 710, in accordance with a determination that propagation of the context to the second electronic device is not permitted (e.g., context includes private information, context has not been approved for sharing), the first electronic device forgoes transmission of the context to the second electronic device. In some embodiments, in accordance with a determination that the second electronic device satisfies the distance criterion with respect to the first electronic device and in accordance with a determination that propagation of the context to the second electronic device is not permitted, the first electronic device forgoes transmission of the context to the second electronic device. In some embodiments, in accordance with a determination that the second electronic device does not satisfy the distance criterion with respect to the first electronic device and in accordance with a determination that propagation of the context to the second electronic device is permitted, the first electronic device forgoes transmission of the context to the second electronic device. In some embodiments, in accordance with a determination that the second electronic device does not satisfy the distance criterion with respect to the first electronic device and in accordance with a determination that propagation of the context to the second electronic device is not permitted, the first electronic device forgoes transmission of the context to the second electronic device.

In some embodiments, in accordance with the determination that propagation of the context to the second electronic device is permitted (e.g., context does not include private information, context has been approved for sharing) and while the second electronic device satisfies the distance criterion with respect to the first electronic device, the second electronic device (e.g., 600b) (e.g., phone of a second user, phone paired with watch) receives the context from the first electronic device (e.g., via Bluetooth, WiFi) and determines at least one context associated with a user of the second electronic device (e.g., a user signed into or registered with the second electronic device) based on the received context (e.g., determines the location of the user of the second electronic device based on the location of the user of the first electronic device).

In some embodiments, the second electronic device (e.g., 600b) displays a current status for the user of the first electronic device, wherein the current status is based on the received context (e.g., "User 1 is at work").

In some embodiments, determining the context associated with the user of the second electronic device includes comparing a confidence value of a second context determined by the second electronic device to a confidence value of the received context (e.g., when both devices have location sensors, second electronic device uses location from device with higher confidence value, or when the two devices determine different activity contexts (e.g., swimming vs walking), second electronic device uses activity with higher confidence value).

In some embodiments, propagation of the context to the second electronic device is permitted when a relationship criterion for the users associated with the first and second electronic devices is satisfied (e.g., when the users are in each other's contact lists, and their devices are within the threshold distance, the context is propagated).

In some embodiments, propagation of the context to the second electronic device is permitted when the context is selected for sharing (e.g., user manually selects context that can be shared).

In some embodiments, propagation of the context to the second electronic device is permitted when the context meets a set of one or more privacy criteria (e.g., non-personal information, user-defined specificity level (e.g., "busy" vs "in a meeting in Conference Room 1")).

In some embodiments, the user of the first electronic device is a first user, and a user of the second electronic device is a second user different from the first user (e.g., contexts are shared between two different people).

In some embodiments, the user of the first electronic device is a first user, and a user of the second electronic device is also the first user (e.g., contexts are shared between two devices of the same user).

In some embodiments, the first electronic device includes one or more types of sensors for determining context, wherein at least one type of the one or more types of sensors is not included in the second electronic device (e.g., first electronic device detects contexts that second electronic device cannot detect (e.g., first electronic device is a phone and second electronic device is a watch)).

In some embodiments, the first electronic devices include a first sensor of a first type and the second electronic device includes a second sensor of the first type (e.g., first and second electronic devices both include the same type of sensor). In some embodiments, in accordance with a determination that the first sensor has a higher performance metric (e.g., more efficient, more accurate) than the second sensor, using the first sensor for determining the context (e.g., location, activity, status) associated with the user of the first electronic device. In some embodiments, in accordance with a determination that the second sensor has a higher performance metric (e.g., more efficient, more accurate) than the first sensor, using the second sensor for determining the context (e.g., location, activity, status) associated with the user of the first electronic device.

In some embodiments, determining the context includes determining a confidence value of the context is greater than a threshold confidence value (e.g., no context is determined if the confidence is below a threshold).

In some embodiments, the context includes one or more of location (e.g., home, work), activity (e.g., walking, swimming, biking, in a car), or status (e.g., busy, in a meeting, free).

Note that details of the processes described above with respect to method 700 (e.g., FIG. 7) are also applicable in an analogous manner to the methods described below. For example, method 800 optionally includes one or more of the characteristics of the various methods described above with reference to method 700. For example, a distance criterion may need to be satisfied for transmission of a context to occur. For brevity, these details are not repeated below.

Figure 8:
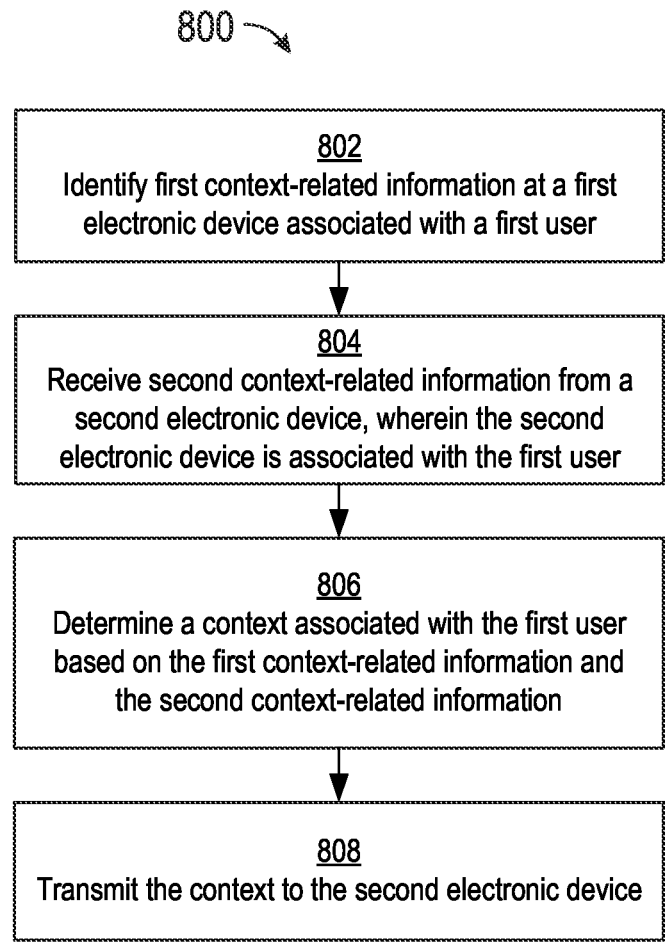
FIG. 8 is a flow diagram illustrating a method for gathering context-related information and distributing a context using an electronic device in accordance with some embodiments.

FIG. 8 is a flow diagram illustrating a method for gathering context-related information and distributing a context using an electronic device in accordance with some embodiments. Method 800 is performed at an electronic device (e.g., 100, 300, 500, 600*a*, 600*b*). Some operations in method 800 are, optionally, combined, the orders of some operations are, optionally, changed, and some operations are, optionally, omitted.

As described below, method 800 provides an intuitive way for gathering context-related information and distributing a context based on the gathered context-related information. The method reduces the cognitive burden on a user by providing a context to multiple devices without additional user input, thereby creating a faster and more efficient human-machine interface. For battery-operated computing devices, enabling the electronic device to determine a context of a user associated with the electronic device without additional user input conserves power and increases the time between battery charges.

At block 802, a first electronic device (e.g., 602*a*) (e.g., phone of a first user, watch) associated with a first user (e.g., a user signed into or registered with the first electronic device) identifies first context-related information (e.g., sensor data from a sensor of the first electronic device; a preliminary context determined by the first electronic device).

At block 804, the first electronic device receives (e.g., via Bluetooth, WiFi) second context-related information from a second electronic device (e.g., sensor data from a sensor of the second electronic device; a preliminary context determined by the second electronic device). The second electronic device is also associated with the first user (e.g., the same first user is signed into or registered with the second electronic device). In some embodiments, the first electronic device receives (e.g., via Bluetooth, WiFi) third context-related information from a third electronic device (e.g., sensor data from a sensor of the third electronic device; a context determined by the third electronic device). The third electronic device is also associated with the first user (e.g., the same first user is signed into or registered with the third electronic device).

At block 806, the first electronic device determines a context (e.g., location, activity, status) associated with the first user based on the first context-related information and the second context-related information. In some embodiments, determining the context associated with the first user includes comparing a first confidence value associated with the first context-related information to a second confidence value associated with the second context-related information (e.g., when both devices have location sensors, context is based on location from device with higher confidence value, or when the two devices determine different activity contexts (e.g., swimming vs walking), the determined context is based on the activity with higher confidence value). In some embodiments, the first electronic device determines the context associated with the first user based on the first context-related information, the second context-related information, and the third context-related information.

At block 808, the first electronic device transmits (e.g., via Bluetooth, WiFi) the context to the second electronic device. In some embodiments, the first electronic device transmits (e.g., via Bluetooth, WiFi) the context to the second electronic device and the third electronic device.

In some embodiments, the first context-related information includes first sensor data from a first sensor of a first type (e.g., location sensor, light sensor, motion sensor), and the second context-related information includes second sensor data from a second sensor of the first type (e.g., same type of sensor as the first sensor). For example, when the first sensor and the second sensor are both location sensors, the context is determined by using the location with a higher confidence.

In some embodiments, the first context-related information includes first sensor data from a first sensor of a first type (e.g., location sensor, light sensor, motion sensor), and the second context-related information includes second sensor data from a second sensor of a second type different from the first type. For example, when the first sensor is a location sensor and the second sensor is a motion sensor, the context is determined by using the data from both sensors.

In some embodiments, the first context-related information includes a first preliminary context from a first contextual category (e.g., location, activity, status), and the second context-related information includes a second preliminary context from the first contextual category (e.g., the same category as the first context. For example, when the first preliminary context is a swimming activity and the second preliminary context is a sitting activity, then the context is determined based on which activity is more likely to be accurate (e.g., has a higher confidence value).

In some embodiments, the first context-related information includes a first preliminary context from a first contextual category (e.g., location, activity, status), and the second context-related information includes a second preliminary context from a second contextual category different from the first contextual category. For example, if the first preliminary context is an activity (e.g., swimming) and the second preliminary context is a location (e.g., gym), then the context is determined by combining the different contextual categories to improve the confidence in the determined context.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to set a context for a user of an electronic device. The present disclosure contemplates that in some instances, this gathered data may include personal information data that uniquely identifies or can be used to contact or locate a specific person. Such personal information data can include context information, demographic data, location-based data, telephone numbers, email addresses, twitter IDs, home addresses, or any other identifying or personal information.

The present disclosure recognizes that the use of such personal information data, in the present technology, can be used to the benefit of users. For example, the personal information data can be used to determine a context of a user. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, context information can determined by inferring a context based on non-personal information data or a bare minimum amount of personal information, such as the content being requested by the device associated with a user, other non-personal information available to the device, or publicly available information.

What is claimed is:
1. A system, comprising a first electronic device and a second electronic device:
   the first electronic device including:
      one or more sensors, including a first sensor of a first type;
      one or more first processors; and first memory storing one or more first programs configured to be executed by the one or more first processors, the one or more first programs including instructions for:
in accordance with a determination that the first sensor of the first type has a higher performance metric than a second sensor of the first type included in the second electronic device, determining a context associated with a user of the first electronic device based at least in part on sensor data output by the first sensor of the first type;
after determining the context based at least in part on sensor data output by the first sensor of the first type, detecting the second electronic device satisfies a distance criterion with respect to the first electronic device;
in response to detecting the second electronic device satisfies the distance criterion with respect to the first electronic device, determining whether propagation of the context to the second electronic device is permitted;
in accordance with a determination that propagation of the context to the second electronic device is permitted and while the second electronic device satisfies the distance criterion with respect to the first electronic device, transmitting the context to the second electronic device; and
in accordance with a determination that propagation of the context to the second electronic device is not permitted, forgoing transmission of the context to the second electronic device; and
the second electronic device including:
the second sensor of the first type;
one or more second processors; and
second memory storing one or more second programs configured to be executed by the one or more second processors, the one or more second programs including instructions for:
in accordance with a determination that the second sensor of the first type has a higher performance metric than the first sensor of the first type included in the first electronic device, determining the context associated with the user of the first electronic device based at least in part on sensor data output by the second sensor of the first type.

2. The system of claim 1, wherein the one or more second programs further include instructions for:
receiving the context from the first electronic device; and
displaying a current status for the user of the first electronic device on the second electronic device, wherein the current status is based on the received context.

3. The system of claim 1, wherein the one or more second programs further include instructions for:
receiving the context from the first electronic device, wherein determining the context associated with the user of the first electronic device includes comparing a confidence value of the context determined by the second electronic device to a confidence value of the received context.

4. The system of claim 1, wherein propagation of the context to the second electronic device is permitted when a relationship criterion for the users associated with the first and second electronic devices is satisfied.

5. The system of claim 1, wherein propagation of the context to the second electronic device is permitted when the context is selected for sharing.

6. The system of claim 1, wherein propagation of the context to the second electronic device is permitted when the context meets a set of one or more privacy criteria.

7. The system of claim 1, wherein the user of the first electronic device is a first user, and a user of the second electronic device is a second user different from the first user.

8. The system of claim 1, wherein the user of the first electronic device is a first user, and a user of the second electronic device is the first user.

9. The system of claim 1, wherein the first electronic device includes one or more types of sensors for determining context, wherein at least one type of the one or more types of sensors is not included in the second electronic device.

10. The system of claim 1, wherein determining the context includes determining a confidence value of the context is greater than a threshold confidence value.

11. The system of claim 1, wherein the context includes one or more of location, activity, or status.

12. One or more non-transitory computer-readable storage mediums storing one or more first programs configured to be executed by one or more first processors of a first electronic device with one or more sensors, including a first sensor of a first type, and one or more second programs configured to be executed by one or more second processors of a second electronic device with a second sensor of the first type,
the one or more first programs including instructions for:
in accordance with a determination that the first sensor of the first type has a higher performance metric than the second sensor of the first type included in the second electronic device, determining a context associated with a user of the first electronic device based at least in part on sensor data output by the first sensor of the first type;
after determining the context based at least in part on sensor data output by the first sensor of the first type, detecting the second electronic device satisfies a distance criterion with respect to the first electronic device;
in response to detecting the second electronic device satisfies the distance criterion with respect to the first electronic device, determining whether propagation of the context to the second electronic device is permitted;
in accordance with a determination that propagation of the context to the second electronic device is permitted and while the second electronic device satisfies the distance criterion with respect to the first electronic device, transmitting the context to the second electronic device; and
in accordance with a determination that propagation of the context to the second electronic device is not permitted, forgoing transmission of the context to the second electronic device; and
the one or more second programs including instructions for:
in accordance with a determination that the second sensor of the first type has a higher performance metric than the first sensor of the first type included in the first electronic device, determining the context associated with the user of the first electronic device based at least in part on sensor data output by the second sensor of the first type.

13. The one or more non-transitory computer-readable storage mediums of claim 12, wherein the one or more second programs further include instructions for:

receiving the context from the first electronic device; and
displaying a current status for the user of the first electronic device on the second electronic device, wherein the current status is based on the received context.

14. The one or more non-transitory computer-readable storage mediums of claim 12, wherein the one or more second programs further include instructions for:
receiving the context from the first electronic device, wherein determining the context associated with the user of the first electronic device includes comparing a confidence value of the context determined by the second electronic device to a confidence value of the received context.

15. The one or more non-transitory computer-readable storage mediums of claim 12, wherein propagation of the context to the second electronic device is permitted when a relationship criterion for the users associated with the first and second electronic devices is satisfied.

16. The one or more non-transitory computer-readable storage mediums of claim 12, wherein propagation of the context to the second electronic device is permitted when the context is selected for sharing.

17. The one or more non-transitory computer-readable storage mediums of claim 12, wherein propagation of the context to the second electronic device is permitted when the context meets a set of one or more privacy criteria.

18. The one or more non-transitory computer-readable storage mediums of claim 12, wherein the user of the first electronic device is a first user, and a user of the second electronic device is a second user different from the first user.

19. The one or more non-transitory computer-readable storage mediums of claim 12, wherein the user of the first electronic device is a first user, and a user of the second electronic device is the first user.

20. The one or more non-transitory computer-readable storage mediums of claim 12, wherein the first electronic device includes one or more types of sensors for determining context, wherein at least one type of the one or more types of sensors is not included in the second electronic device.

21. The one or more non-transitory computer-readable storage mediums of claim 12, wherein determining the context includes determining a confidence value of the context is greater than a threshold confidence value.

22. The one or more non-transitory computer-readable storage mediums of claim 12, wherein the context includes one or more of location, activity, or status.

23. A method, comprising:
at a first electronic device with one or more sensors, including a first sensor of a first type:
in accordance with a determination that the first sensor of the first type has a higher performance metric than a second sensor of the first type included in a second electronic device, determining a context associated with a user of the first electronic device based at least in part on sensor data output by the first sensor of the first type;
after determining the context based at least in part on sensor data output by the first sensor of the first type, detecting a second electronic device satisfies a distance criterion with respect to the first electronic device;
in response to detecting the second electronic device satisfies the distance criterion with respect to the first electronic device, determining whether propagation of the context to the second electronic device is permitted;
in accordance with a determination that propagation of the context to the second electronic device is permitted and while the second electronic device satisfies the distance criterion with respect to the first electronic device, transmitting the context to the second electronic device; and
in accordance with a determination that propagation of the context to the second electronic device is not permitted, forgoing transmission of the context to the second electronic device; and
at the second electronic device:
in accordance with a determination that the second sensor of the first type has a higher performance metric than the first sensor of the first type included in the first electronic device, determining the context associated with the user of the first electronic device based at least in part on sensor data output by the second sensor of the first type.

24. The method of claim 23, further comprising:
receiving the context from the first electronic device; and
displaying a current status for the user of the first electronic device on the second electronic device, wherein the current status is based on the received context.

25. The method of claim 23, wherein the one or more second programs further include instructions for:
receiving the context from the first electronic device, wherein determining the context associated with the user of the first electronic device includes comparing a confidence value of the context determined by the second electronic device to a confidence value of the received context.

26. The method of claim 23, wherein propagation of the context to the second electronic device is permitted when a relationship criterion for the users associated with the first and second electronic devices is satisfied.

27. The method of claim 23, wherein propagation of the context to the second electronic device is permitted when the context is selected for sharing.

28. The method of claim 23, wherein propagation of the context to the second electronic device is permitted when the context meets a set of one or more privacy criteria.

29. The method of claim 23, wherein the user of the first electronic device is a first user, and a user of the second electronic device is a second user different from the first user.

30. The method of claim 23, wherein the user of the first electronic device is a first user, and a user of the second electronic device is the first user.

31. The method of claim 23, wherein the first electronic device includes one or more types of sensors for determining context, wherein at least one type of the one or more types of sensors is not included in the second electronic device.

32. The method of claim 23, wherein determining the context includes determining a confidence value of the context is greater than a threshold confidence value.

33. The method of claim 23, wherein the context includes one or more of location, activity, or status.

* * * * *